(12) United States Patent
Mukhopadhyay

(10) Patent No.: US 8,861,494 B2
(45) Date of Patent: Oct. 14, 2014

(54) SELF-ORGANIZING COMMUNICATION NETWORKS

(75) Inventor: Amit Mukhopadhyay, Westfield, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 78 days.

(21) Appl. No.: 13/486,003

(22) Filed: Jun. 1, 2012

(65) Prior Publication Data

US 2012/0307697 A1 Dec. 6, 2012

Related U.S. Application Data

(60) Provisional application No. 61/493,302, filed on Jun. 3, 2011.

(51) Int. Cl.
*H04W 4/00* (2009.01)
*H04W 24/02* (2009.01)
(52) U.S. Cl.
CPC ............ *H04W 24/02* (2013.01); *Y02B 60/50* (2013.01); *H04W 4/001* (2013.01)
USPC ....................................... 370/338

(58) Field of Classification Search
USPC .............. 370/312, 338, 341, 329; 726/2
See application file for complete search history.

(56) References Cited

U.S. PATENT DOCUMENTS

| | | | | |
|---|---|---|---|---|
| 7,493,393 | B2 * | 2/2009 | Narayanan | 709/225 |
| 8,279,810 | B1 * | 10/2012 | Li et al. | 370/328 |
| 8,289,883 | B2 * | 10/2012 | Zhu et al. | 370/255 |

* cited by examiner

*Primary Examiner* — Chandrahas Patel
(74) *Attorney, Agent, or Firm* — Wall & Tong LLP

(57) ABSTRACT

A self-organizing network (SON) capability is provided. A SON may be configured by building intelligence and automation into the network to enable network operators to address various challenges associated with operation of the network. A SON may include one or more of a self-configuration function, a physical cell identifier (PCI) configuration function, a neighbor relationship management function, an energy savings function, a cell outage function, a cellular coverage function, a handoff function, a load-balancing function, an Inter-Cell Interference Coordination (ICIC) function, a Random Access Channel (RACH) function, a capacity function, or the like. A SON provides a network operator with a path to increase network performance with less effort, enables reductions in Operating Expenditure (OPEX), enables relatively rapid adaptation to network conditions, enables increases in network quality, and so forth.

24 Claims, 14 Drawing Sheets

400

SELF-ORGANIZING COMMUNICATION NETWORKS

CROSS-REFERENCE TO RELATED APPLICATIONS

This application claims the benefit of U.S. Provisional Patent Application Ser. No. 61/493,302, filed Jun. 3, 2011, which is hereby incorporated herein by reference in its entirety.

TECHNICAL FIELD

The invention relates generally to communication networks and, more specifically but not exclusively, to self-organizing communication networks.

BACKGROUND

Fourth Generation (4G) wireless networks support large numbers of wireless subscribers. The wireless subscribers may utilize various services and application having associated traffic that is packetized and transported via Internet Protocol (IP) networks having many network elements using different transport technologies and applied quality-of-service (QoS) policies. Such wireless networks are inherently complex and present new challenges to network service providers and the network management tools relied upon by the network service providers to ensure consistent delivery of high-quality services to the wireless subscribers.

Existing network management systems used within the context of, illustratively, network operations centers (NOCs) provide a visualization of a deployed communication network that can be graphically manipulated by the user to provide various management functions. However, while useful, existing network management systems typically require significant human knowledge of the network topology and likely sources of failure or operational degradation. Specifically, presented with an undesired operational mode, a skilled operator in the NOC may understand what type of elements or sub-elements within the network are likely the cause of the failure or undesired operational mode and, thus, can then address the failure or the undesired operational mode.

Unfortunately, few have the necessary knowledge or skills for this task. Further, it is seen to be desirable to assist operators in some tasks, as well as to automatically perform other tasks where practicable.

SUMMARY

Various deficiencies in the prior art are addressed by embodiments for providing a self-organizing network (SON).

In one embodiment, an apparatus is configured to support a self-optimizing network (SON) comprising a wireless access node. The apparatus includes a processor and a memory communicatively connected to the processor. The processor is configured to perform a self-configuration function to automatically configure the wireless access node for operation within the SON, perform a physical cell identifier (PCI) configuration function configured to assign a PCI to the wireless access node, and perform a neighbor relationship management function configured to determine at least one neighbor wireless access node for inclusion in a neighbor list of the wireless access node.

In one embodiment, an apparatus is configured to support a self-optimizing network (SON) comprising a wireless access node. The apparatus includes a processor and a memory communicatively connected to the processor. The processor is configured to perform an energy savings function configured to switch a power mode of an element of the wireless access node, perform a cell outage function configured to monitor for a cell outage condition associated with the wireless access node, and perform a cellular coverage function configured to improve cellular coverage within the SON based on information associated with the energy savings function and information associated with the cell outage function.

In one embodiment, an apparatus is configured to support a self-optimizing network (SON) comprising a wireless access node. The apparatus includes a processor and a memory communicatively connected to the processor. The processor is configured to perform a handoff function configured to improve handoffs of wireless devices between the wireless access node and one or more other wireless access nodes based on terrain information associated with the SON and network information associated with the SON, perform a load-balancing function configured to balance a load on the wireless access node based on information from the handoff function, and perform a capacity function configured to manage capacity usage at the wireless access node.

BRIEF DESCRIPTION OF THE DRAWINGS

The teachings herein can be readily understood by considering the following detailed description in conjunction with the accompanying drawings, in which.

DETAILED DESCRIPTION

In at least some embodiments, a management capability is provided for managing a Fourth Generation (4G) Long Term Evolution (LTE) wireless network. The management capability may include one or more of an analyzer tool, an audit tool, a trace tool, an enforcement tool, or the like, as well as combinations thereof. Although primarily depicted and described herein within the context of providing management functions within a 4G LTE wireless network, it will be appreciated that the management functions depicted and described herein may be utilized within other types of wireless networks.

Figure 1:
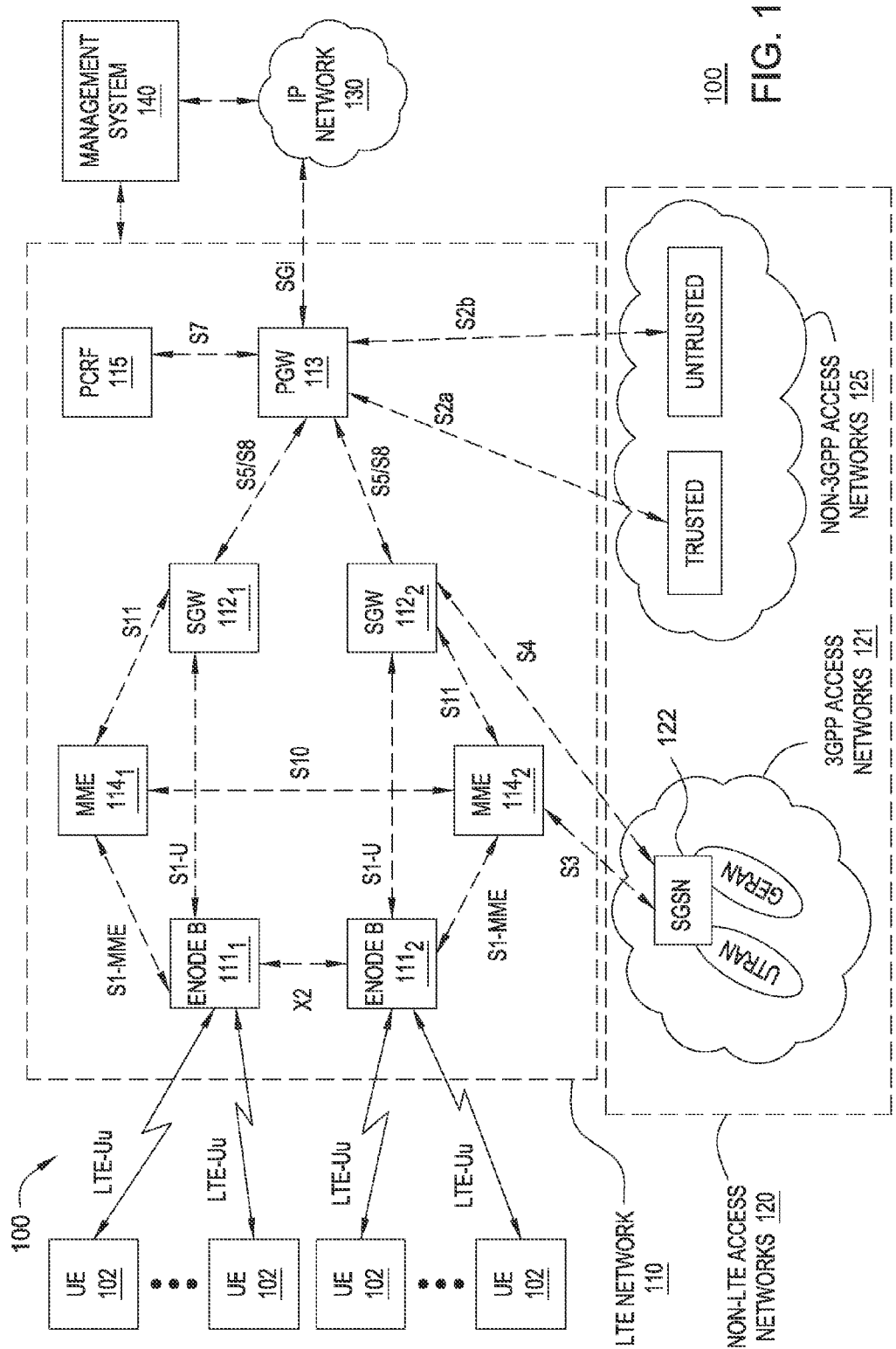
FIG. 1 depicts an exemplary wireless communication system including a management system for managing a wireless network.

FIG. 1 depicts an exemplary wireless communication system including a management system for managing a wireless network. Specifically, FIG. 1 depicts an exemplary wireless communication system 100 that includes a plurality of User Equipments (UEs) or User Devices (UDs) 102, a Long Term Evolution (LTE) network 110, non-LTE access networks 120, IP networks 130, and a management system (MS) 140. The LTE network 110 supports communications between the UEs 102 and IP networks 130. The non-LTE access networks 120 interface with LTE network 110 for enabling UEs associated with non-LTE access networks 120 to utilize the LTE network 110 to access IP networks 130. The MS 140 is configured for supporting various management functions for LTE network 110.

The UEs 102 are wireless user devices capable of accessing a wireless network, such as LTE network 110. The UEs 102 are capable of supporting one or more bearer sessions to IP networks 130 via LTE network 110. The UEs 102 are capable of supporting control signaling in support of the bearer session(s). The UEs 102 each may have one or more identifiers associated therewith. For example, a UE 102 may have one or more of an International Mobile Subscriber Identity (IMSI), an International Mobile Equipment Identity (IMEI), and like identifiers or identities associated therewith. For example, each of the UEs 102 may be a phone, PDA, computer, or any other wireless user device. Multiple UDs are typically active at all times for each eNodeB.

The LTE network 110 is an exemplary LTE network. The configuration and operation of LTE networks will be understood by one skilled in the art. However, for purposes of completeness, a description of general features of LTE networks is provided herein within the context of exemplary wireless communication system 100.

The LTE network 110 includes two eNodeBs $111_1$ and $111_2$ (collectively, eNodeBs 111), two Serving Gateways (SGWs) $112_1$ and $112_2$ (collectively, SGWs 112), a Packet Data Network (PDN) Gateway (PGW) 113, two Mobility Management Entities (MMEs) $114_1$ and $114_2$ (collectively, MMEs 114), and a Policy and Charging Rules Function (PCRF) 115. The eNodeBs 111 provide a radio access interface for UEs 102. The SGWs 112, PGW 113, MMEs 114, and PCRF 115, as well as other components which have been omitted for purposes of clarity, cooperate to provide an Evolved Packet Core (EPC) network supporting end-to-end service delivery using IP.

The eNodeBs 111 support communications for UEs 102. As depicted in FIG. 1, each eNodeB 111 supports a respective plurality of UEs 102. The communication between the eNodeBs 111 and the UEs 102 is supported using LTE-Uu interfaces associated with each of the UEs 102. The eNodeBs 111 may support any functions suitable for being supported by an eNodeB, such as providing an LTE air interface for the UEs 102, performing radio resource management, facilitating communications between UEs 102 and SGWs 112, maintaining mappings between the LTE-Uu interfaces and S1-u interfaces supported between the eNodeBs 111 and the SGWs 112, and the like, as well as combinations thereof.

The SGWs 112 support communications for eNodeBs 111. As depicted in FIG. 1, SGW $112_1$ supports communications for eNodeB $111_1$ and SGW $112_2$ supports communications for eNodeB $111_2$. The communication between the SGWs 112 and the eNodeBs 111 is supported using respective S1-u interfaces. The S1-u interfaces support per-bearer user plane tunneling and inter-eNodeB path switching during handover. The S1-u interfaces may use any suitable protocol, e.g., the GPRS Tunneling Protocol—User Place (GTP-U). The SGWs 112 may support any functions suitable for being supported by an SGW, such as routing and forwarding user data packets (e.g., facilitating communications between eNodeBs 111 and PGW 113, maintaining mappings between the S1-u interfaces and S5/S8 interfaces supported between the SGWs 112 and PGWs 113, and the like), functioning as a mobility anchor for UEs during inter-eNodeB handovers, functioning as a mobility anchor between LTE and other 3GPP technologies, and the like, as well as combinations thereof.

The PGW 113 supports communications for the SGWs 112. The communication between PGW 113 and SGWs 112 is supported using respective S5/S8 interfaces. The S5 interfaces provide functions such as user plane tunneling and tunnel management for communications between PGW 113 and SGWs 112, SGW relocation due to UE mobility, and the like. The S8 interfaces, which are Public Land Mobile Network (PLMN) variants of the S5 interfaces, provide inter-PLMN interfaces providing user and control plane connectivity between the SGW in the Visitor PLMN (VPLMN) and the PGW in the Home PLMN (HPLMN). The S5/S8 interfaces may utilize any suitable protocol (e.g., the GPRS Tunneling Protocol (GTP), Mobile Proxy IP (MPIP), and the like, as well as combinations thereof). The PGW 113 facilitates communications between LTE network 110 and IP networks 130 via an SGi interface. The PGW 113 may support any functions suitable for being supported by an PGW, such as providing packet filtering, providing policy enforcement, functioning as a mobility anchor between 3GPP and non-3GPP technologies, and the like, as well as combinations thereof.

The MMEs 114 provide mobility management functions in support of mobility of UEs 102. The MMEs 114 support the eNodeBs 111. The MME $114_1$ supports eNodeB $111_1$ and the MME $114_2$ supports eNodeB $111_2$. The communication between MMEs 114 and eNodeBs 111 is supported using respective S1-MME interfaces, which provide control plane protocols for communication between the MMEs 114 and the eNodeBs 111. The S1-MME interfaces may use any suitable protocol or combination of protocol. For example, the S1-MME interfaces may use the Radio Access Network Application Part (eRANAP) protocol while using the Stream Control Transmission Protocol (SCTP) for transport. The MMEs 114 support the SGW 112. The MME $114_1$ supports SGW $112_1$ and the MME $114_2$ supports SGW $112_2$. The communication between MMEs 114 and SGWs 112 is supported using respective S11 interfaces. The MMEs $114_1$ and $114_2$ communicate using an S10 interface. The MMEs 114 may support any functions suitable for being supported by a MME, such selecting SGWs for UEs at time of initial attachment by the UEs and at time of intra-LTE handovers, providing idle-mode UE tracking and paging procedures, bearer activation/deactivation processes, providing support for Non-Access Stratum (NAS) signaling (e.g., terminating NAS signaling, ciphering/integrity protection for NAS signaling, and the like), lawful interception of signaling, and the like, as well as combinations thereof. The MMEs 114 also may communicate with a Home Subscriber Server (HSS) using an S6a interface for authenticating users (the HSS and the associated S6a interface are omitted for purposes of clarity).

The PCRF 115 provides dynamic management capabilities by which the service provider may manage rules related to services provided via LTE network 110 and rules related to charging for services provided via LTE network 110. For example, rules related to services provided via LTE network 110 may include rules for bearer control (e.g., controlling acceptance, rejection, and termination of bearers, controlling QoS for bearers, and the like), service flow control (e.g., controlling acceptance, rejection, and termination of service flows, controlling QoS for service flows, and the like), and the like, as well as combinations thereof. For example, rules related to charging for services provided via LTE network 110 may include rules related to online charging (e.g., time-based charging, volume-based charging, event-based charging, and the like, which may depend on factors such as the type of service for which charging is being provided), offline charging (e.g., such as for checking subscriber balances before services are provided and other associated functions), and the like, as well as combinations thereof. The PCRF 115 communicates with PGW 113 using a S7 interface. The S7 interface supports transfer of rules from PCRF 115 to a Policy and Charging Enforcement Function (PCEF) supported by PGW 113, which provides enforcement of the policy and charging rules specified on PCRF 115.

As depicted in FIG. 1, elements of LTE network 110 communicate via interfaces between the elements. The interfaces described with respect to LTE network 110 also may be referred to as sessions. For example, the communication between eNodeBs and SGWs is provided via S1-u sessions, communication between SGWs and PGWs is provided via S5/S8 sessions, and so forth, as depicted in FIG. 1 and described herein. The sessions of LTE network 110 may be referred to more generally as S* sessions. It will be appreciated that each session S* that is depicted in FIG. 1 represents a communication path between the respective network elements connected by the session and, thus, that any suitable underlying communication capabilities may be used to support the session S* between the network elements. For example, a session S* may be supported using anything from direct hardwired connections to full network connectivity (e.g., where the session S* is transported via one or more networks utilizing nodes, links, protocols, and any other communications capabilities for supporting the communication path) and anything in between, or any other suitable communications capabilities.

For example, an S1-u session between an eNodeB 111 and an SGW 112 may be supported using an Internet Protocol (IP)/Multiprotocol Label Switching (MPLS) transport capability including mobile backhaul elements associated with the eNodeB 111 (e.g., using service aware routers (SARs), service access switches (SAS), and the like) and mobile backhaul elements associated with the SGW 112 (e.g., multi-service edge routers and/or other similar elements), as well as an IP/MPLS aggregation network facilitating communications between the mobile backhaul elements associated with the eNodeB 111 and the mobile backhaul elements associated with the SGW 112). Similarly, an S1-u session between an eNodeB 111 and an SGW 112 may be supported using an IP routing network using a routing protocol (e.g., Open Shortest Path First (OSPF), Intermediate System to Intermediate System (ISIS) and the like). The types of underlying communications capabilities which may be utilized to support each of the different types of sessions of LTE network 110 will be understood by one skilled in the art.

The LTE network 110 supports access to IP networks 130 from non-LTE networks 120.

The non-LTE networks 120 with which the LTE network 110 may interface include 3GPP access networks 121. The 3GPP access networks 121 may include any 3GPP access networks suitable for interfacing with LTE network 110 (e.g., 2.5G networks, 3G networks, 3.5G networks, and the like). For example, the 3GPP access networks 121 may include Global System for Mobile (GSM) Enhanced Data Rates for GSM Evolution (EDGE) Radio Access Networks (GERANs), Universal Mobile Telecommunications System (UMTS) Terrestrial Radio Access Networks (UTRANs), or any other 3GPP access networks suitable for interfacing with LTE, and the like, as well as combinations thereof.

The LTE network 110 interfaces with 3GPP access networks 121 via a Serving General Packet Radio Service (GPRS) Support Node (SGSN) 122. The MME $114_2$ supports control plane functionality for mobility between LTE network 110 and 3GPP access networks 121 using communication with SGSN 122 via an S3 interface. For example, the S3 interface enables user and bearer information exchange for 3GPP network access mobility in idle and/or active state. The SGW $112_2$ supports user plane functionality for mobility between LTE network 110 and 3GPP access networks 121 using communication with SGSN 122 via an S4 interface. For example, the S4 interface provides the user plane with related control and mobility support between SGSN 122 and SGW $112_2$.

The non-LTE networks with which the LTE network may interface include non-3GPP access networks 125. The non-3GPP access networks 125 may include any non-3GPP access networks suitable for interfacing with LTE network 110. For example, the non-3GPP access networks may include 3GPP2 access networks (e.g., Code Division Multiple Access 2000 (CDMA 2000) networks and other 3GPP2 access networks), Wireless Local Area Networks (WLANs), and the like. The support for mobility between the LTE network 110 and the non-3GPP access networks 125 may be provided using any suitable interface(s), such as one or more of the S2a interface, the S2b interface, the S2c interface, and the like, as well as combinations thereof. The S2a interface provides control and mobility support to the user plane for trusted non-3GPP access to the LTE network. The S2a interface may provide access for trusted non-3GPP networks using any suitable protocol(s), such as MPIP, Client Mobile IPv4 Foreign Agent (FA) mode (e.g., for trusted non-3GPP access that does not support MPIP), and the like, as well as combinations thereof. The S2b interface provides control and mobility support to the user plane for non-trusted non-3GPP access to the LTE network. The S2b interface may be provided an interface between PGW 113 and an evolved Packet Data Gateway (ePDG) associated with the non-trusted non-3GPP access network. The S2b interface may use any suitable protocol, such as MPIP or any other suitable protocols. The S2c interface provides control and mobility support to the user plane for providing UEs access to PGW 113 via trusted and/or non-trusted 3GPP access using one or more protocols based on Client Mobile IP co-located mode.

The LTE network 110 includes an Evolved Packet System/Solution (EPS). In one embodiment, the EPS includes EPS nodes (e.g., eNodeBs 111, SGWs 112, PGW 113, MMEs 114, and PCRF 115) and EPS-related interconnectivity (e.g., the S* interfaces, the G* interfaces, and the like). The EPS-related interfaces may be referred to herein as EPS-related paths.

The IP networks 130 include one or more packet data networks via which UEs 102 may access content, services, and the like. For example, the IP networks 130 include an IP Core network and, optionally, one or more other IP networks (e.g., IP Multimedia Subsystem (IMS) networks and the like). The IP networks 130 support bearer and control functions in support of services provided to UEs 102 via LTE network 110. The IP Core network is capable of providing any functions which may be provided by such a core network. The IP Core network is a packet data network via which UEs 102 may access content, services, and the like.

The IMS network is capable of providing any functions which may be provided by an IMS network.

The MS 140 provides management functions for managing the LTE network 110. The MS 140 may communicate with LTE network 110 in any suitable manner. In one embodiment, for example, MS 140 may communicate with LTE network 110 via a communication path 141 which does not traverse IP network networks 130. In one embodiment, for example, MS 140 may communicate with LTE network 110 via a communication path 142 which via IP network networks 130. The communication paths 141 and 142 may be implemented using any suitable communications capabilities. An exemplary management system suitable for use as MS 140 of FIG. 1 is depicted and described with respect to FIG. 2.

As depicted and described herein, the communication system 100 is merely exemplary. It will be appreciated that, although depicted and described herein with respect to specific numbers and arrangements of eNodeBs 111, SGWs 112, PGW 113, MMEs 114, and PCRF 115, an LTE wireless network may be implemented using different numbers and/or arrangements of eNodeBs 111, SGWs 112, PGW 113, MMEs 114, and PCRF 115. For example, LTE networks are typically implemented hierarchically, such as where the LTE network includes one or more PGWs, each of the PGWs supports respective pluralities of SGWs, and each of the SGWs supports respective pluralities of eNodeBs. It will be further appreciated that, although depicted and described herein with respect to an LTE wireless network that supports specific types of interfaces (namely, the S* interfaces, as well as other non-S interfaces), many other types of interfaces may be supported between elements of an LTE wireless network and/or between components of an LTE wireless network and components of non-LTE wireless networks. As such, management functions depicted and described herein are not limited to use in any particular configuration of an LTE wireless network.

Figure 2:
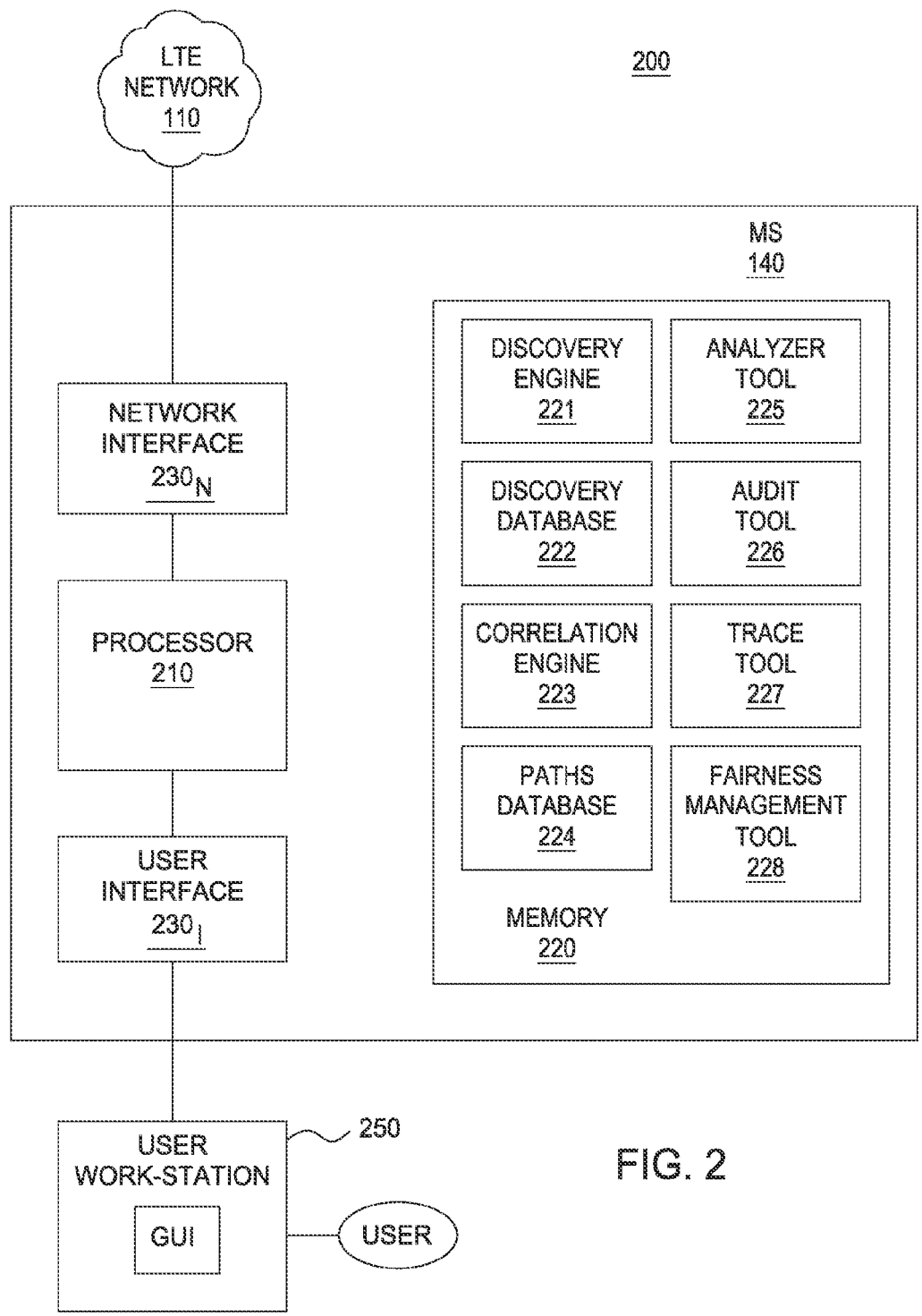
FIG. 2 depicts an exemplary management system suitable for use as the management system of FIG. 1.

FIG. 2 depicts an exemplary management system suitable for use as the management system of FIG. 1. As depicted in FIG. 2, MS 140 includes a processor 210, a memory 220, a network interface $230_N$, and a user interface $230_1$. The processor 210 is coupled to each of the memory 220, the network interface $230_N$, and the user interface $230_1$.

The processor 210 is adapted to cooperate with the memory 220, the network interface $230_N$, the user interface $230_1$, and the support circuits 240 to provide various management functions for LTE network 110.

The memory 220, generally speaking, stores data and tools that are adapted for use in providing various management functions for LTE network 110. The memory includes a Discovery Engine (DE) 221, a Discovery Database (DD) 222, a Correlation Engine (CE) 223, a Paths Database (PD) 224, an Analyzer Tool (ANT) 225, an Audit Tool (AUT) 226, a Trace Tool (TT) 227, and a Fairness Management Tool (FMT) 228.

In one embodiment, the DE 221, CE 223, ANT 225, AUT 226, TT 227, and FMT 228 are implemented using software instructions which may be executed by processor (e.g., processor 210) for performing the various management functions depicted and described herein.

The DD 222 and PD 224 each store data which may be generated by and used by various ones and/or combinations of the engines and tools of memory 220. The DD 222 and PD 224 may be combined into a single database or may be implemented as respective databases. Either of the combined or respective databases may be implemented as single databases or multiple databases in any of the arrangements known to those skilled in the art.

Although depicted and described with respect to an embodiment in which each of the engines, databases, and tools is stored within memory 120, it will be appreciated by those skilled in the art that the engines, databases, and/or tools may be stored in one or more other storage devices internal to MS 140 and/or external to MS 140. The engines, databases, and/or tools may be distributed across any suitable numbers and/or types of storage devices internal and/or external to MS 140. The memory 220, including each of the engines, databases, and tools of memory 220, is described in additional detail herein below.

The network interface $230_N$ is adapted to facilitate communications with LTE network 110. For example, network interface $230_N$ is adapted to receive information from LTE network 110 (e.g., discovery information adapted for use in determining the topology of LTE network, results of test initiated by MS 140 to LTE network 110, and the like, as well as any other information which may be received by MS 140 from LTE network 110 in support of the management functions performed by MS 140). Similarly, for example, network interface $230_N$ is adapted to transmit information to LTE network 110 (e.g., discovery requests for discovering information adapted for use by MS 140 in determining the topology of LTE network, audits request for auditing portions of LTE network 110, and the like, as well as any other information which may be transmitted by MS 140 to LTE network 110 in support of the management functions performed by MS 140).

The user interface $230_1$ is adapted to facilitate communications with one or more user workstations (illustratively, user workstation 250), for enabling one or more users to perform management functions for LTE network 110. The communications include communications to user workstation 250 (e.g., for presenting imagery generated by MS 140) and communications from user workstation 250 (e.g., for receiving user interactions with information presented via user workstation 250). Although primarily depicted and described as a direct connection between MS 140 and user workstation 250, it will be appreciated that the connection between MS 140 and user workstation 250 may be provided using any suitable underlying communication capabilities, such that user workstation 250 may be located proximate to MS 140 (e.g., such as where both MS 140 and user workstation 250 are located within a Network Operations Center (NOC)) or remote from MS 140 (e.g., such as where communications between MS 140 and user workstation 250 may be transported over long distances).

Although primarily depicted and described herein with respect to one user workstation, it will be appreciated that MS 140 may communicate with any suitable number of user workstations, such that any number of users may perform management functions for LTE network 110 (e.g., such as where a team of technicians at a NOC access MS 140 via respective user workstations for performing various management functions for LTE network 110). Although primarily depicted and described with respect to user workstations, it will be appreciated that user interface $230_1$ may be adapted to support communications with any other devices suitable for use in managing LTE network 110 via MS 140 (e.g., for displaying imagery generated by MS 140 on one or more common NOC display screens, for enabling remote Virtual Private Network (VPN) access to MS 140 by users via remote computers, and the like, as well as various combinations thereof). The use of user workstations to perform management functions via interaction with a management system will be understood by one skilled in the art.

As described herein, memory 220 includes the DE 221, DD 222, CE 223, PD 224, ANT 225, AUT 226, TT 227, and FMT 228, which cooperate to provide the various management functions depicted and described herein. Although primarily depicted and described herein with respect to specific functions being performed by and/or using specific ones of the engines, databases, and/or tools of memory 220, it will be appreciated that any of the management functions depicted and described herein may be performed by and/or using any one or more of the engines, databases, and/or tools of memory 220.

The engines and tools may be activated in any suitable manner. In one embodiment, for example, the engines and tools may be activated in response to manual requests initiated by users via user workstations, in response to automated requests initiated by MS 140, and the like, as well as various combinations thereof.

For example, where an engine or tool is activated automatically, the engine or tool may be activated in response to scheduled requests, in response to requests initiated by MS 140 based on processing performed at MS 140 (e.g., such as where results generated by CE 223 indicate that ANT 225 should be invoked, such as where results of an audit performed by ANT 225 indicate that the TT 227 should be invoked, such as where results of a mobile session path trace performed by TT indicate that FMT 228 should be invoked, and the like, as well as combinations thereof). A description of the engines, databases, and tools of MS 140 follows.

In one embodiment, where an automatically triggered engine or tool begins to consume computing or other resources above a threshold level, subsequent automatic triggering of the engine or tool is constrained. In this embodiment, an alarm or status indicator is provided to the network manager indicative of the constrained automatic triggering condition such that the network manager or operating personnel may assume direct or manual control of the engine or tool.

As previously noted, various embodiments of an LTE network 110 include an Evolved Packet System/Solution (EPS) infrastructure having EPS nodes (e.g., eNodeBs 111, SGWs 112, PGW 113, MMEs 114, and PCRF 115) and EPS-related interconnectivity (e.g., S* interfaces, the G* interfaces, and the like). Within the context of this present disclosure, the EPS-related interfaces are referred to herein as EPS-related paths or simply paths.

The infrastructure is architected to provide the appropriate and necessary EPS nodes for supporting the wireless services offered by the network service provider. The network service provider manages the network to provide its service offerings to its wireless/mobile users in a manner consistent with the consumer expectations. For example, wireless/mobile users (e.g., users of standard telephones, smart phones, computers and the like purchasing various voice, data or other service offerings) expect near perfect telephone/voice service, very near perfect data services, glitch-free streaming media and the like. Third party service providers purchasing service bundles for their own users expect the same, as well as management level interfaces and other mechanisms to provide interoperability between the various networks. Customer expectations may comprise an assumed or expected level of service, a level of service defined in a service level agreement (SLA) and the like.

Various embodiments are directed to network management systems and tools wherein each EPS-related interconnection is correlated to the specific infrastructure necessary to support that functionality. That is, for each EPS-related path, an association is made to the specific infrastructure necessary to support that path, including the network elements, sub-elements, links and so on which, if they fail or degrade, will result in failure or degradation of the associated EPS-related path.

By understanding which traffic flows or paths include an element, sub element or link as a necessary support element, the network management system can then know which traffic flows or paths are impacted by the degradation/failure of a specific element, sub-element, or link. This is especially useful in the context of an analysis tool, as will be discussed in more detail elsewhere.

Similarly, by understanding which traffic flow or path has failed or degraded, the network management system can then identify which elements, sub elements or links are necessary to support the traffic flow or path. In this manner, the network manager reduces the complexity of identifying the element(s), sub-element(s) and/or link(s) that failed/degraded element or sub element associated with the traffic flow or path that failed or degraded. This is especially useful in the context of a trace tool, as well be discussed in more detail elsewhere.

Within the context of correlation, the management system may create a service representation for each connection between a network element or sub-element.

For example, if a specific output port of a first network element transmits data to a destination address associated with a second network element, and a specific input port of the second network element receives data from a source address associated with the first network element, the service aware manager creates a service representation indicating that the specific output port of the first network element and specific input port of the second network element are connected. If either of the ports associated with the service representation fails or degrades, then the service supported by the packet flow between the specific ports will also fail or degrade. However, either of the network elements having ports associated with the service representation would normally not detect a failure of the other network element. In the event of a failure of the transmitting port of the first network element, the second network element would not necessarily realize that a failure has occurred. Similarly, in the event of a failure of the receiving port of the second network element, the first network element would not necessarily realize that a failure has occurred.

In various embodiments, a connection is provided between ports at either or both of the physical level (e.g., a cable or other physical level link) or the service level (e.g., a generalized cloud or other service level link).

In one physical level connection embodiment, if a port (or other sub-element) on a first network element (NE) fails, then a corresponding or connected port (or other sub-element) on a second NE will show a link down status (LLDP). In this manner, the second NE is aware of the failure of the first NE. In other physical level connection embodiment, such awareness is provided within the context of neighboring network elements, such as routers or switches and/or their various sub-elements.

In one service level embodiment, a port (or other sub-element) on a first NE may be connected directly to a port (or other sub-element) on a second NE, or through one or more ports (or other sub-elements) of one or more NEs (i.e., multiple hops between the first and second NEs). In this embodiment, if the port (or other sub-element) on the first or any intermediate NE fails or degrades, the management system may not be aware that the failure/degradation exists due to the operational status of the last NE in the sequence of NEs. However, due to the management techniques and tool discussed herein, the network manager is made aware of the initial or intermediate failure/degradation. Various causes of this behavior include congestion, local/regional rerouting and the like. In brief, status indicators are green (indicative of appropriate operation), but the performance of this portion of the network is constrained or degraded. This constrained or degraded network operation is correlated and illustrated by the various embodiments discussed herein.

The discovery engine (DE) 221 is generally adapted for providing network discovery functions for discovering information about LTE network 110. Generally speaking, the DE 221 performs a discovery process in which configuration information, status/operating information and connection information regarding the elements and sub-elements forming the network is gathered, retrieved, inferred and/or generated as will be discussed in more detail below.

The discovery process may be dynamic in that the underlying elements, sub-elements, and links within the LTE network may change over time due to local network adaptations, rerouting, failures, degradations, scheduled maintenance, and the like. Thus, the DE 221 may be invoked after a network change is detected or caused by any of the ANT 225, AUT 226, TT 227, and FMT 228.

At a first discovery level, the network management system (NMS) uses any legacy database information to discover the various elements (and the corresponding sub-elements) forming the network to be managed. That is, some of this discovery comprises the use of existing database information which provides a general blueprint of the network to be managed. Information in such a database includes information associated with the major functional elements forming a network, the major pipes or conduits established within the network and so on. While such information may be extremely detailed, the information does not reflect path-level network operation.

At a second discovery level, the network management system requests configuration information, status/operating information and connection information from each of the network elements within the managed network. The requested information includes information useful in determining the specific switches, ports, buffers, protocols and the like within the network elements that support the various traffic flows.

The network management system may also utilize the existing database information to infer possible connections between network elements and sub-elements and connections within the network being managed. For example, the existing database information may be constructed as depicting a sequence of connected network elements that may support traffic flows between them. However, the existing database information likely does not include information identifying the specific switches, ports, buffers, protocols, address information of received/transmitted packets, and the like within the network elements that support the various traffic flows.

The configuration information may include information identifying a network element, the function and/or configuration of the network element, the function and/or configuration of the sub-elements forming a network element and so on. Configuration information illustratively includes, but is not limited to, information identifying the type of network element, protocols supported by the network element, services supported by the network element and so on. Configuration information illustratively includes information attending to the various sub-elements within the network element, such as the input ports, switches, buffers, and output ports and so on associated with the sub-elements forming a network element.

The status/operating information may include status/operating information associated with the operating state of the network element and/or the sub-elements forming a network element. Status/operating information illustratively includes, but is not limited to, information providing operating status/alarm indicators, including information pertaining to metrics such as packet count, utilization level, component pass/fail indication, bit error rate (BER) and the like.

The connection information may include information useful in ascertaining or inferring the connections between network elements and/or sub-elements, such as the source of data received from the network element or its sub-elements, the destination of data transmitted by the network element or its sub-elements and so on. That is, connection information is information provided by a network element from the subjective perspective of the network element. The network element does not necessarily have information specifically identifying the network elements from which it receives packets or the network element toward which it transmits packets. For example, connection information illustratively includes, but is not limited to, source address information associated with received packets, destination address information associated with transmitted packets, protocol information associated with packet flows, service information associated with packet flows, deep packet inspection results data, and the like.

At a third discovery level, the network management system uses the discovered information to form a detailed framework representing each of the elements, sub-elements and links forming the infrastructure of the network, as well as their respective and various interconnections.

Generally speaking, the DE 221 may discover any suitable information associated with LTE network 110, which may be referred to collectively herein as discovery information, and further divided into configuration information, status/operating information and connection information.

In one embodiment, for example, DE 221 discovers components of the LTE network 110 and information associated with components of the LTE network 110. The components of LTE network 110 that are discovered by DE 221 may include any components, such as network elements (EPC network elements, non-EPC network elements, and the like), sub-elements of network elements (e.g., chassis, traffic cards, control cards, interfaces, ports, processors, memory, and the like), communication links connecting network elements, interfaces/sessions that support communications between network elements (e.g., LTE-Uu sessions, S* sessions, and the like), reference points, functions, services, and the like, as well as combinations thereof.

For example, DE 221 may discover the network elements of LTE network 110 (e.g., EPC network elements such as the eNodeBs 111, SGWs 112, PGW 113, MMEs 114, PCRF 115, and the like; non-EPC network elements that facilitate communication via sessions between the EPC network elements; and the like, as well as combinations thereof).

For example, DE 221 may discover network element configuration information associated with network elements of LTE network 110 (e.g., chassis configurations, line cards, ports on the line cards, processors, memory, and the like, which may depend on the types of network elements for which discovery is performed).

For example, DE 221 may discover interface/session information (e.g., information associated with LTE-Uu sessions, information associated with S* sessions, and the like, as well as combinations thereof). For example, DE 221 may discover reference points of LTE network 110 (e.g., the LTE-Uu, S1-u, S1-MME, X2, and other reference points associated with eNodeBs; the S1-u, S5/S8, S11, S4, and other reference points associated with SGWs; the S5/S8, SGi, SGx, S7, S2a, S2b, S2c, and other reference points associated with PGWs; the S1-MME, S11, S10, and other reference points associated with MMEs, the S7 and other reference points associated with PCRFs; and the like).

For example, DE 221 may discover functions, services, and the like, as well as combinations thereof. For example, DE 221 may discover information related to connectivity between network elements of LTE 110, which may include physical connectivity information and logical connectivity information (e.g., identification of communication links deployed within LTE network 110, identification of wavelengths being transported over particular fibers within LTE network 110, and the like, as well as combinations thereof).

The DE 221 may discover any other information that is associated with LTE network 110 and which is or may be suitable for use in providing the various management functions depicted and described herein (e.g., for use by CE 223 in determining paths of LTE network 110, for use by ANT 225 in performing analysis for LTE network 110, for use by AUT 226 in performing audits within LTE network 110, for use by TT 227 in performing mobile session path traces for mobile sessions within LTE network 110, for use by FMT 228 for providing enforcement functions within LTE network 110, and the like, as well as combinations thereof).

The DE 221 may discover the information associated with LTE network 110 in any suitable manner (e.g., from any suitable sources, at any suitable times, using any suitable protocols, in any suitable formats, and the like, as well as combinations thereof).

In one embodiment, for example, DE 221 may receive discovery information associated with LTE network 110 from one or more management systems associated with LTE network 110 (e.g., from other management systems, such as network inventory systems, network provisioning systems, and the like), from one or more element management systems (EMSs) managing respective subsets of the network elements of LTE network 110, from the network elements of LTE network 110, and the like, as well as combinations thereof.

In one embodiment, for example, the DE 221 may receive discovery information upon initial boot-up of elements of LTE network 110, via periodic updates initiated by elements of LTE network 110, in response to periodic updates requested by DE 221, in response to on-demand requests initiated by DE 221, and the like, as well as combinations thereof. The periodic requests may be configured to be performed using at any suitable intervals.

In one embodiment, on-demand requests to the DE 221 may be in initiated in response to any suitable trigger conditions (e.g., in response to manually requests initiated by a user via user workstation 210, in response to requests initiated by CE 223 for purposes of obtaining additional discovery information for use in performing correlation functions, in response to requests initiated by ANT 225 for purposes of obtaining additional discovery information for use in performing analysis functions, in response to requests initiated by AUT 226 for purposes of obtaining additional discovery information for use in performing audit functions, in response to requests initiated by AT 227 for purposes of obtaining additional discovery information for use in performing trace functions, in response to requests initiated by FMT 228 for purposes of obtaining additional discovery information for use in performing enforcement functions, and the like, as well as combinations thereof).

The DE 221 may receive the discovery information using any suitable management and/or communications protocols. In one embodiment, for example, the DE 221 may receive discovery information via one or more of Simple Network Management Protocol (SNMP) traps, Network Configuration Protocol (NETCONF) messages, Transaction Language 1 (TL1) messages, and the like, as well as various combinations thereof.

The discovered information is stored in one or more databases to facilitate rapid retrieval by network operations personnel and/or other users, such as the Discovery Database (DD) 222. The DD 222 may store the discovery information in any suitable format, as will be understood by one skilled it the art. The DD 222 provides a repository of discovery information for use by CE 223 and, optionally, for use by one or more of ANT 225, AUT 226, TT 227, and FMT 228 for providing their respective management functions.

The CE 223 provides correlation of information used to support the management functions depicted and described herein. The CE 223 utilizes configuration information, status/operations information and/or connections information, illustratively provided by the DE 221 and stored within the DD 222, to correlate discovered network element, sub-element and link functions to specific customer traffic flows and/or paths supporting customer services. That is, using the framework representing each of the elements, sub-elements and links within the network and their various interconnections, the CE 223 correlates each customer service, traffic flow, and/or EPS-path to the specific elements, sub-elements and links necessary to support the customer service, traffic flow and/or path.

The correlation process may be dynamic in that, for any given path, the underlying elements, sub-elements, and links supporting that path may change over time due to local network adaptations, rerouting, failures, degradations, scheduled maintenance, and the like. Thus, CE 223 may be invoked after a network change is detected or caused by any of the ANT 225, AUT 226, TT 227, and FMT 228.

The CE operates to maintain a current representation of the necessary supporting infrastructure associated with each customer service, traffic flow, and/or path. By providing this representation, efforts responsive to customer service failure or degradation can be focused on the specific element, sub-element and link functions supporting the impacted customer service (e.g., by using TT 227). Similarly, efforts responsive to element, sub-element, and link function failure or degradation can be focused on the specific customers and/or services supported by the impacted element, sub-element, and link function.

It is noted that, typically, only a small subset of the sub-elements within a particular element is necessary to support a particular path. Thus, a failure associated with other sub-elements within an element does not impact that particular path. By correlating to each path only those elements necessary to support the path, the processing/storage burdens associated with managing individual paths are reduced by avoiding processing/storage requirements associated with nonessential (from the perspective of a particular path) elements.

In one embodiment, CE 223 may process discovery information stored in DD 222 for purposes of determining the underlying transport elements supporting the paths of LTE network 110, which is then stored in PD 224. In one embodiment, the path correlated transport element information determined by CE 223 and stored in PD 224 include EPS-related paths of LTE network 110. In general, an EPS-related path is a path that is a transport mechanism that represents a peering relationship between two EPS reference points, where an EPS reference point is a termination point for any node of LTE network 110 that implements one or more of the protocols present in the 4G specification (e.g., using GTP, PMIP, or any other suitable protocols, and the like, as well as combinations thereof). The path correlated transport element information may comprise network elements, communications links, subnets, protocols, services, applications, layers and any portions thereof. These transport elements may be managed by the network management system or portions thereof. The network management system may simply be aware of these transport elements.

As depicted and described herein, EPS reference points may include: for an eNodeB (S1-u, S1-MME, X2, and the like); for an SGW 112 (S1-u, S5/S8, S11, Gxs, and the like); for a PGW (S5/S8, SGi, SGx, S7, S2a, S2b, S2c, and the like); for an MME (S1-MME, S11, S10, and the like); and for a PCRF (S7). Thus, EPS-related paths correspond generally to the various S* sessions between the eNodeBs and EPC nodes (e.g., a path between an eNodeB 111 and an SGW 112 in the case of S1-u reference points, a path between an SGW 112 and PGW 113 in the case of S5/S8 reference points, a path between an eNodeB 111 and an MME 114 in the case of S1-MME reference points, and the like).

In one embodiment, the path correlated transport element information determined by CE 223 and stored in PD 224 include other types of paths (e.g., paths other than EPS-related paths). For example, the other types of paths may includes one or more of: (1) paths that form sub-portions of EPS-related paths (e.g., where an EPS-related path is supported using underlying communications technology, the path that forms a sub-portion of the EPS-related path may be a path associated with the underlying communications technology, (2) paths that include multiple EPS-related paths (e.g., paths from eNodeBs to PGWs that traverse both S1-u and S5/S8 sessions, paths from UEs to SGWs that traverse both LTE-Uu sessions and S1-u sessions, and the like), and (3) end-to-end mobile session paths (e.g., paths between UEs and IP networks). The path correlated transport element information determined by CE 223 and stored in PD 224 may include other information correlated with various types of paths.

The path correlated transport element information determined by the CE 223 and stored in the PD 224 may be determined using any suitable processing.

The CE 223 is adapted for making direct correlations between discovered components of LTE network 110. For example, CE 223 may determine from the discovery information that a particular port on an eNodeB is connected to a particular port on a service router used to provide backhaul between the eNodeB and its SGW. For example, CE 223 may determine from the discovery information that a particular S1-u reference point on an eNodeB 111 is coupled to a particular S1-u reference point on an SGW 112. For example, CE 223 may determine from the discovery information that, for a given SGW 112, a particular S1-u interface on the eNodeB facing side of the SGW 112 maps to a particular S5/S8 reference point on the PGW facing side of the SGW 112. It will be appreciated that the foregoing examples are just a few of the many possible correlations which may be made by CE 223. The CE 223 is adapted for making any correlations between discovered components of LTE network 110 that enable CE 223 to determine a comprehensive view of the entire LTE network at all layers (e.g., from the physical layer all the way through the application layer and everything in between).

The CE 223 is adapted for making inferences regarding associations between discovered components of LTE network 110. For example, CE 223 may have information indicating that certain data is being transmitted from a certain port on an eNodeB via a S1-u interface of the eNodeB and may have information indicating that certain data is being received at a certain port on an SGW via an S1-u interface of the SGW, and may use this information about the data in order to infer that the port of the eNodeB and the port of the SGW are logically connected for communicating via the S1-u interface. For example, CE 223 may have information indicating that the interface on an eNodeB is directly connected to the SGW through a physical Link, through a routed network, or through a VPN service (L2, L3).

In one embodiment, the network manager within which the CE 223 is operative includes substantially all of the information related to the peering of different EPS Paths (including S1-u ). From that peering information, the CE 223 may identify nodes on each end of a path and then identify or examine the corresponding neighbor nodes. From the neighbor node information, the CE 223 may then identify or examine a next group of neighbor nodes and so on.

This process of identifying or examining in sequence each subsequent group of neighbor nodes advantageously uses the incrementally gained neighborhood node information to reduce (or filter) candidate neighbors to form thereby a smaller list. This process, especially when used in conjunction with a topology Discovery Profile (template) selected by the operator, reduces the complexity and processing resource allocation associated with the correlation process.

A topology Discovery Profile or template is an association of a path with a "hint" or other guidance indicative of a type of path, Mobile Service, segments forming the path or Mobile Service, types of nodes at the endpoint of the segments and so on. For example, a particular network operator may typically architect paths according to one of two or three standard techniques. In this case, the operator may provide a hint about the architecture pertaining to a path of interest.

A topology Discovery Profile or template is especially useful within the context of a trying to manage a cloud or unmanageable portion of a network, such as a portion of a network leased from a third party network provider. For example, to fill out service gaps within a network, a network operator may lease network services from a third party. Unfortunately, while the third party is obligated to provide the leased services according to a service-level agreement, the third party typically does not provide any ability for the network operator leasing the services to manage infrastructure within the third party network supporting the leased network services.

In one embodiment, the third party network operator providing the leased services provides hints or a profile/template indicative of the likely topology or infrastructure used to support the leased services. That is, the network operator provides services according to one or more of a finite number of topology options or infrastructure options. The network operator may provide this information to the lessee such that the service aware manager of the lessee may more clearly understand the particular infrastructure elements supporting the paths through the leased portion of its network.

For example, a network operator may indicate or "hint" that a particular S1-u corresponds to a particular Discovery Profile or template number, where each number represents a particular topology or infrastructure. For example, a first hint or template may provide that connections between an eNodeB and a SGW are provided by a specific number of segments or links, where each segment or link corresponds to a respective segment or link type, and where each of the segments or links interconnects eNodeBs, switches, routers and other network elements in a particular manner. For example, an operator hint or profile may indicate that a first segment is a pure routing segment, a second segment is a physical Link (e.g., LLDP will automatically provide a peer), a third segment is an E-Pipe (P2P L2VPN) and so on. Other hints or templates may provide different topologies, connections arrangements and the like.

The correlation engine begins processing a path upon discovering that path from a managed network element. The correlation engine calculates, infers and/or otherwise discovers the various infrastructure elements, sub-elements and links supporting that path upon discovery of the path.

In one embodiment, an initial S1-u reference point in the SGW is discovered. When any reference points or S-peers is discovered, a corresponding S-path is then formed.

In various embodiments, a service aware manager provides discovery and/or correlation of the entire network at once, by section or region, or by individual nodes or network elements. In this manner, EPS peers can be discovered (or resynchronized) throughout the operational life of the service aware manager. For example, EPS peers may be created in accordance with a discovery or with an event (e.g., an SNMP Trap or other event) indicating that a new EPS Peer has been created on a NE. This may happen, illustratively, when an operator is installing a new eNodeB in the network and the newly installed eNodeB becomes the peer of an existing (and already managed) SGW.

It will be appreciated that the foregoing examples are just a few of the many possible inferences which may be made by CE 223. The CE 223 is adapted for making any inferences related to correlation of discovered components of LTE network 110 that enable CE 223 to determine a comprehensive view of the entire LTE network at all layers (e.g., from the physical layer all the way through the application layer and everything in between).

The paths determined by the CE 223 may have any suitable path information associated therewith. In one embodiment, for example, path information associated with an EPS-related path may include any information indicative of the underlying communications capabilities supporting the EPS-related path. For example, the path information for an EPS-related path may include information identifying S* reference points forming the endpoints of the EPS-related path, identifying network elements supporting the path (e.g., routers, switches, and the like), identifying ports on the network elements that support the path, identifying IP interfaces supporting the path, specifying configurations of the IP interfaces supporting the path, specifying the configurations of the ports of network elements that support the path (e.g., administrative configurations, operational configurations, and the like), and the like, as well as combinations thereof.

For example, the path information for an EPS-related path may include other information that is associated with the portions of the underlying communication network supporting the EPS-related path, e.g., identification of communication links between network elements, identification of logical paths on the communication links (e.g., such as specific MPLS paths supporting the EPS-related path, specific wavelengths in optical fibers supporting the EPS-related path, and the like), and the like, as well as combinations thereof. In one embodiment, for example, path information associated with other types of paths may include some or all of the path information described with respect to EPC paths, other types of path information (which may depend on the other types of paths), and the like, as well as combinations thereof. In such embodiments, the path information associated with a path may include any other suitable information, which may vary for different types of paths, for different paths of the same type, and the like.

In one embodiment, CE 223 may support additional processing in order to support management functions provided by one or more of the tools (i.e., ANT 225, AUT 226, TT, 227, and FMT 228). In one embodiment, CE 223 may process discovery information stored in DD 222 and/or path correlated transport element information stored in PD 224 in order to support management functions provided by one or more of ANT 225 (e.g., for providing analysis functions), AUT 226 (e.g., for providing audit functions), TT 227 (e.g., for providing trace functions), and FMT 228 (e.g., for providing enforcement functions). In one embodiment, CE 223 may process management function information generated by one or more of the tools in support of management functions provided by one or more of the tools (e.g., where CE 223 processes information on behalf of one or more of the tools for use by that tool or for use by one or more of the other tools in providing management functions). The CE 223 may provide any other correlation functions suitable for providing and/or supporting the various management functions depicted and described herein.

In various embodiments, paths are grouped together in a logical structure according to a common element, sub-element, link, service, provider, third party service lessee and so on.

A bundle may be a logical grouping of paths that share a common element, such as a common end point element, start point element and the like. In this context, bundling is useful to identifying all of the paths that will be impacted by the failure of the common element. That is, a number of paths terminated at a particular network element from a plurality of other network elements of a common type may be defined as a bundle or group. Examples include "all of the eNodeB elements in communication with SGWx" where SGWx represents a specific SGW); or "all of the SGWs communicating with a PGWx" (where PGWx represents a specific PGW). These and other bundles or groups may be defined to enable rapid identification of network elements or sub-elements that are similarly situated in terms of a common network element or sub element to which they are connected.

A bundle may be generalized as a logical grouping of paths that share any common structure or entity, such as a group of paths associated with a common billing entity, a specific network provider, a specific service offering and the like. In this context, bundling is useful in identifying the specific infrastructure (and its usage) associated with a billing entity, network provider, service offering and the like. This is especially useful within the context of leasing network resources to a third party under a service level agreement where it is necessary to both monitor usage and support the services purchased by the third party. Examples include "all the mobile services that are anchored in an eNodeB that services a specific Access Point Name (APN) (such as a telecommunications or cable company); or "all of the SGWs or PGWs that service a particular service provider." In a service provider example, a third party service provider may lease space at one or more eNodeBs to provide service to its mobile users (e.g., via specific reserved frequencies on each of a plurality of eNodeBs).

The correlated information is stored in one or more databases to facilitate rapid retrieval by network operations personnel and/or other users, such as the Path Database (PD) 224. The PD 224 stores path correlated transport element information determined by CE 223. The PD 224 may store the path correlated transport element information and associated path information in any suitable format. The PD 224 provides a repository of path and network element related information for use by one or more of ANT 225, AUT 226, TT 227, and FMT 228 for providing their respective management functions.

Figure 3:
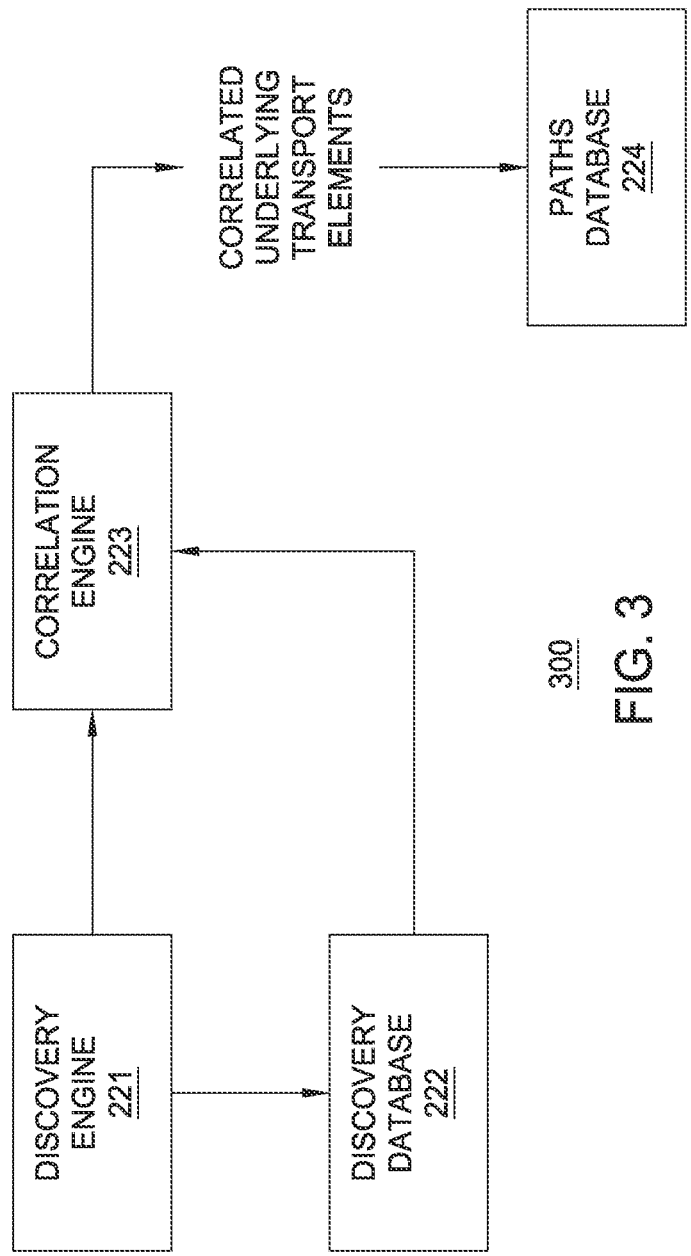
FIG. 3 depicts a high-level block diagram illustrating a discovery and correlation process performed by the exemplary management system of FIG. 2.

FIG. 3 depicts a high-level block diagram illustrating a discovery and correlation process performed by the exemplary management system of FIG. 2. As depicted in FIG. 3, and described herein with respect to FIG. 2, the discovery and correlation process 300 performed by exemplary MS 140 is performed by DE 221, DD 222, CE 223, and PD 224. The DE 221 discovers information associated with LTE network 110 and stores discovery information in DD 222, DE 221 and DD 222 provide discovery information to CE 223 for use by CE 223 in correlating the discovery information for identifying paths of the LTE network and storing the path correlated transport element information associated with the identified paths of the LTE network in the PD 224. The discovery and correlation process 300 of FIG. 3 may be better understood by way of reference to FIG. 2.

As depicted in FIG. 2, ANT 225, AUT 226, TT 227, and FMT 228 each provide various management functions for LTE network 110.

The ANT 225 structures EPS elements of an LTE network into Mobile Services. In one embodiment, the EPS elements include the EPS network elements (e.g., eNodeBs, SGWs, PGWs, MMEs, the PCRF, and/or any other EPS-related network elements) and the EPS-related interconnectivity between the EPS network elements (e.g., S* sessions, G* sessions, and the like). For example, with respect to LTE network 110 of FIG. 1, the ANT 225 structures EPS elements of the LTE network 110 into Mobile Services (e.g., eNodeBs 111, SGWs 112, PGW 113, MMEs 114, PCRF 115, S* sessions, and the like). In this manner, a Mobile Service is a representation of EPS network elements and EPS-related interconnectivity between the EPS network elements.

The Mobile Service stores for each network element a list of all of the other network elements connected to it. Thus, for a particular eNodeB, the Mobile Service stores a list including the SGW and PGW to which the eNodeB communicates. Similarly, for a particular SGW, the mobile service stores a list including the eNodeBs and PGW to which the SGW communicates. Other common or anchor elements may be used to form such bundles. These examples contemplate, respectively, a particular eNodeB as an anchor or common element and a particular SGW as an anchor or common element. Other anchors or common elements may be defined within the context of the various embodiments.

The ANT 225 may structure EPS elements of LTE network 110 into Mobile Services using any suitable information (e.g., using the underlying transport elements correlated to EPS-related paths from PD 224, by processing discovery information from DD 222, and the like, as well as combinations thereof). In one embodiment, ANT 225 is configured to automatically create Mobile Services as areas of the LTE network 110 are discovered by DE 221.

Figure 4:
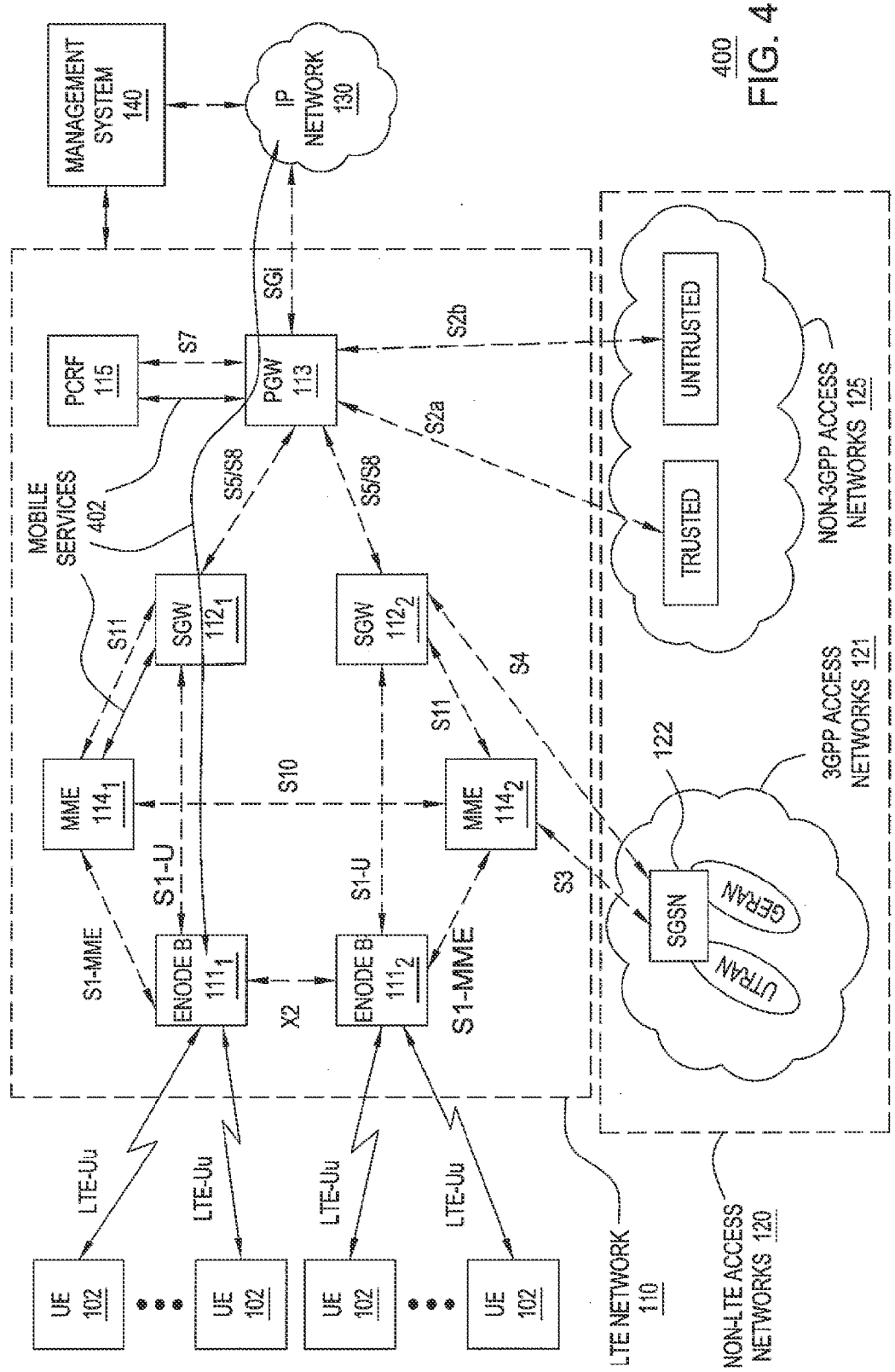
FIG. 4 depicts an exemplary Mobile Service supported by the LTE network of FIG. 1.

FIG. 4 depicts an exemplary Mobile Service supported by the LTE network of FIG. 1. Specifically, FIG. 4 depicts an exemplary communication system 400 that is substantially identical to exemplary communication system 100 of FIG. 1, except that FIG. 4 further depicts a path associated with a Mobile Service 402.

As depicted in FIG. 4, the exemplary Mobile Service 402 includes eNodeB $111_1$, SGW $112_1$, PGW 113, the S1-u interface between eNodeB $111_1$ and SGW $112_1$, the S5/S8 interface between SGW $112_1$ and PGW 113, the SGi interface between PGW 113 and IP networks 130, the S1-MME interface between eNodeB $111_1$ and MME $114_1$, the S1-u interface between SGW $112_1$ and MME $114_1$, and the S7 interface between PGW 113 and PCRF 115. The exemplary Mobile Service 402 is marked on FIG. 4 using a solid line representation. Optional embodiments may include MME $114_1$ and PCRF 115, for example.

The ANT 225 enables the service provider of an LTE network to have a current view of the status of the service delivery distribution network from the IP Core network through the eNodeB access nodes at the edge of the LTE network. The ANT 225 enables the service provider of an LTE network to monitor the status of the LTE network at a logical level. This is advantageous for efficiently diagnosing problems or potential problems which may impede delivery of mobile traffic within the LTE network. For example, equipment of the LTE network may be operational, but misconfiguration on an SGW instance might be blocking delivery of mobile traffic.

The ANT 225 enables the service provider of an LTE network to quickly and easily identify which components of the LTE network 110 are responsible for problems or potential problems identified at the Mobile Service level of LTE network 110, e.g., by identifying which EPS element(s) are responsible for the problem or potential problem, and then further identifying which component(s) of the responsible EPS element(s) are responsible for the problem or potential problem.

For example, this may include identifying, at the Mobile Service level, a specific EPS network element that is responsible for the problem, and then drilling down on the EPS network element that is responsible for the problem to identify components of the EPS network element that are responsible for the problem. The components of EPS network elements may include any components of the EPS network elements (e.g., traffic cards, control cards, ports, interfaces, processors, memory, and the like).

For example, this may include identifying, at the Mobile Service level, a specific EPS interconnection (e.g., S* sessions, G* sessions, and the like) that is responsible for the problem, and then drilling down on the EPS interconnection that is responsible for the problem to identify components of the EPS interconnection that are responsible for the problem. The components of EPS interconnections may include any components. It will be appreciated that the EPS interconnections described with respect to ANT 225 correspond to the EPS-related paths described with respect to CE 223 and correlated to underlying transport elements such as provided via PD 224. Thus, the components of EPS interconnections may include components associated with EPS-related paths as discussed with respect to the CE 223 and PD 224 (i.e., the transport elements and components that provide the underlying communications capability for the EPS-related paths).

For example, the components of EPS-related paths may include S* reference points forming the endpoints of the EPS-related paths, network elements (e.g., routers, switches, and the like), components of network elements (e.g., line cards, ports, interface, and the like), communication links between network elements, logical paths on communication links between network elements (e.g., such as specific MPLS paths supporting the EPS-related path, specific wavelengths in optical fibers supporting the EPS-related path, and the like), and the like, as well as combinations thereof.

The ANT 225 may drill down on EPS elements in any suitable manner, which may depend on the type of EPS element for which component information is desired (e.g., using discovery information stored in DD 222 for determining components of EPS network elements, using the path correlated transport elements, sub-elements, systems and other information stored in PD 224 for determining components of EPS-related paths, and the like, as well as combinations thereof).

The ANT 225 may perform one or more management functions for Mobile Services determined by ANT 225.

In one embodiment, ANT 225 may collect statistics associated with Mobile Services (e.g., end-to-end statistics associated with the Mobile Service, statistics associated with individual components and/or subsets of components of the Mobile Service, and the like, as well as combinations thereof). The ANT 225 may analyze collected statistics for identifying the presence of congestion, or impending presence of congestion, associated with Mobile Services. The ANT 225 may proactively determine, on the basis of such analysis, solutions for resolving or preventing congestion.

In one embodiment, ANT 225 may initiate audits for verifying Mobile Services (e.g., for ensuring that the view of Mobile Services currently maintained by ANT 225 is accurate and does not need to be updated, for use in updating the view of Mobile Services where such updating is required, and the like, as well as combinations thereof). The ANT 225 may analyze the results of such audits for determining the manner in which the LTE network has been built (or discovered) in order to find topological and/or configuration errors within the LTE network and, further, for suggesting associated improvements.

In one embodiment, ANT 225 may initiate Operations, Administration, and Maintenance (OAM) tests for Mobile Services. In this embodiment, the OAM tests may be initiated in any suitable manner. For example, OAM tests may be initiated manually, automatically in response to any suitable trigger conditions (e.g., per a fixed schedule, in response to detecting an indication of a fault associated with a component which may form part of the Mobile Service, and the like), and the like, as well as combinations thereof). For example, OAM tests may be generated for a specific Mobile Service and then scheduled at different times of the day to monitor the status of the Mobile Service. The ANT 225 may be configured to use the results of such OAM tests to identify areas of high contention within the LTE network 110.

The ANT 225 may perform fault analysis for Mobile Services. In one embodiment, for example, in response to detecting an event on one of the sub-components of a Mobile Service(s), ANT 225 may determine the effect of the event on the Mobile Service(s). The ANT 225 may identify any events which may be associated with components of Mobile Services (e.g., EPS network elements, EPS interface, and the like). The ANT 225 may identify events in any suitable manner using messages associated with any suitable management protocol(s), such as SNMP traps, TL1 messages, and the like. The ANT 225 may categorize detected events based on their importance. The importance may be determined based on any suitable parameter or parameters (e.g., the location of the event, the type of event, and the like, as well as combinations thereof). For example, an event associated with an eNodeB may be deemed to be less important than an event associated with a PGW, since PGWs support a much larger number of users than eNodeBs.

The ANT 225 may initiate generation of imagery adapted for being displayed to provide network technicians of the service provider with a visual representation of the event (e.g., location of the event, scope of the event, and the like).

The ANT 225 also may initiate one or more OAM tests (e.g., ping, traceroute, and the like) for the Mobile Service(s) associated with the event, in order to determine additional information providing a better understanding of the scope and impact of the event. The ANT 225 may initiate such OAM tests manually and/or automatically (e.g., as part of error detection, as part of a scheduled initiation of OAM tests, and the like, as well as combinations thereof).

The ANT 225 may perform any other suitable management functions associated with Mobile Services determined by ANT 225.

Generally speaking, the analyzer tool may be invoked after the network manager discovers the network elements and their connections as previously described. The service aware manager identifies the LTE type network elements, such as PGW, SGW, eNodeB, MME, PCRF, SGSN, and the like. Of primary interest are the PGW, SGW, and eNodeB. Between these network elements are EPS paths having associated reference points on the network elements, where the EPS paths/reference points are denoted as S1-u, S5, SGi and so on. Thus, stored in a database is a collection of modular components of type "network element" for the PGW, SGW, eNodeB and the like, or type "connector" for the EPS paths.

After discovering the network elements and connectors, the service aware manager defines a plurality of Mobile Services by connecting or concatenating instances of the two types of modular components (i.e., network elements and connectors), such as the sequence of network elements and connectors between a customer served via a specific eNodeB and a data stream or other service received from the IP core network at the PGW. Thus, in one embodiment, a mobile service comprises a structure or wrapper containing a concatenated sequence of network elements and connectors. A Mobile Service may be defined in terms of a particular customer, a particular eNodeB, a particular APN and so on. A mobile service may include one or more instances of an EPS on a network element, such as one or more of an SGW or a PGW on a single or common network element.

After defining the Mobile Services, the Mobile Services may be analyzed or tested. Such testing may be directed to the components forming a Mobile Service, the endpoints associated with the Mobile Service and the like. Such testing may be directed to specific portions of specific components or endpoint forming the Mobile Service.

In one embodiment, individual Mobile Services or groups of Mobile Services are analyzed by collecting statistics from each of the Mobile Service modular components forming the particular individual or groups of Mobile Services. That is, a Mobile Service analysis request (generated manually or automatically) is interpreted by the management system as a request to gather statistical information pertaining to each of the modular components (e.g., network elements and connectors) forming a Mobile Service.

For example, assume that a Mobile Service comprises a plurality of network elements and connectors arranged in the following sequence: "eNodeB, S1-u , SGW, S5, PGW". In response to an analysis request of the Mobile Service, the analysis tool gathers statistical values associated with each of the components forming the Mobile Service (i.e., the elements and connectors) to provide thereby data describing, illustratively, the operational status of the Mobile Service, the components forming a Mobile Service, the endpoints of the Mobile Service and/or other information pertaining to the Mobile Service.

In one embodiment, OAM tests such as ping tests (e.g., ICMP ping test), trace route tests and the like may be run upon the Mobile Service to ensure that the components forming a Mobile Service are operational and not degraded, that connectivity between the various components exists, that the test results conform to expected test results such as based upon a rolling average or other historical/statistical representation of prior test results. In this manner, an OAM test ensures that Mobile Services are operational and, further, obtains statistical information useful in predicting degradations or failures of one or components forming the Mobile Service. For example, an OAM test may comprise the execution of specific Mobile Service tests every 15 minutes, two hours or other predetermined time period.

All tests performed on the Mobile Service or Mobile Service portions will return some result. The result should fall within an acceptable or expected results range. Results returned outside of this range (or not returned at all) are likely indicative of an immediate or existing problem with the Mobile Service components, sub-components, or endpoints. For example, a ping test indicating a 1 second delay time between a PGW and an eNodeB may be indicative of a problem in a Mobile Service between these two endpoints. By sequentially "pinging" each of the network elements in the connection, components forming a Mobile Service proximate the location of the problem may be found quickly (e.g., the component after which the return result changes from a normal low delay value to the 1 second delay time).

Changes in the returned result of one or more tests over time may also be indicative of a problem that exists or a problem that will exist in the future. By tracking the results of these tests over time, and correlating the test results to degradations and/or failures over time, operating characteristics associated with impending degradations and/or failures may be predicted.

In one embodiment, the analysis tool automatically instantiates tests or suites of tests in response to specific operating characteristics of the network, manual requests for test suites, automatic requests for test suites, and the like. A test suite comprises a plurality of predefined tests to be performed upon one or more Mobile Services either once or periodically in which specific test results ranges are expected. Test suites log the various parameters associated with the tests, the network element and connection components tested, and any ancillary data that is desired (e.g., other network operating characteristics such as bandwidth utilization, bit error rate and the like that are useful in correlating test result data changes over time to specific problems).

The tests or suites of tests are invoked depending upon the severity of alarm, the importance of the network component raising the alarm, the type of alarm and so on. As an example, an alarm raised by an eNodeB to its Mobile Service is less important than a similar alarm raised by a PGW. Alarm triggers may be used in various embodiments to invoke tests or suites of tests. Generally speaking, a trigger condition may be associated with a starting point parameter (e.g., an initial network element or communication link associated with the trigger condition) and/or a task parameter (e.g., one or more tasks forming at least a portion of an appropriate response to the trigger condition).

Thus, the logical representation of modular components such as "network element" and "connector" to form Mobile Services enables precise auditing, analysis and tracing functions to be implemented within the context of the various embodiments.

Figure 5:
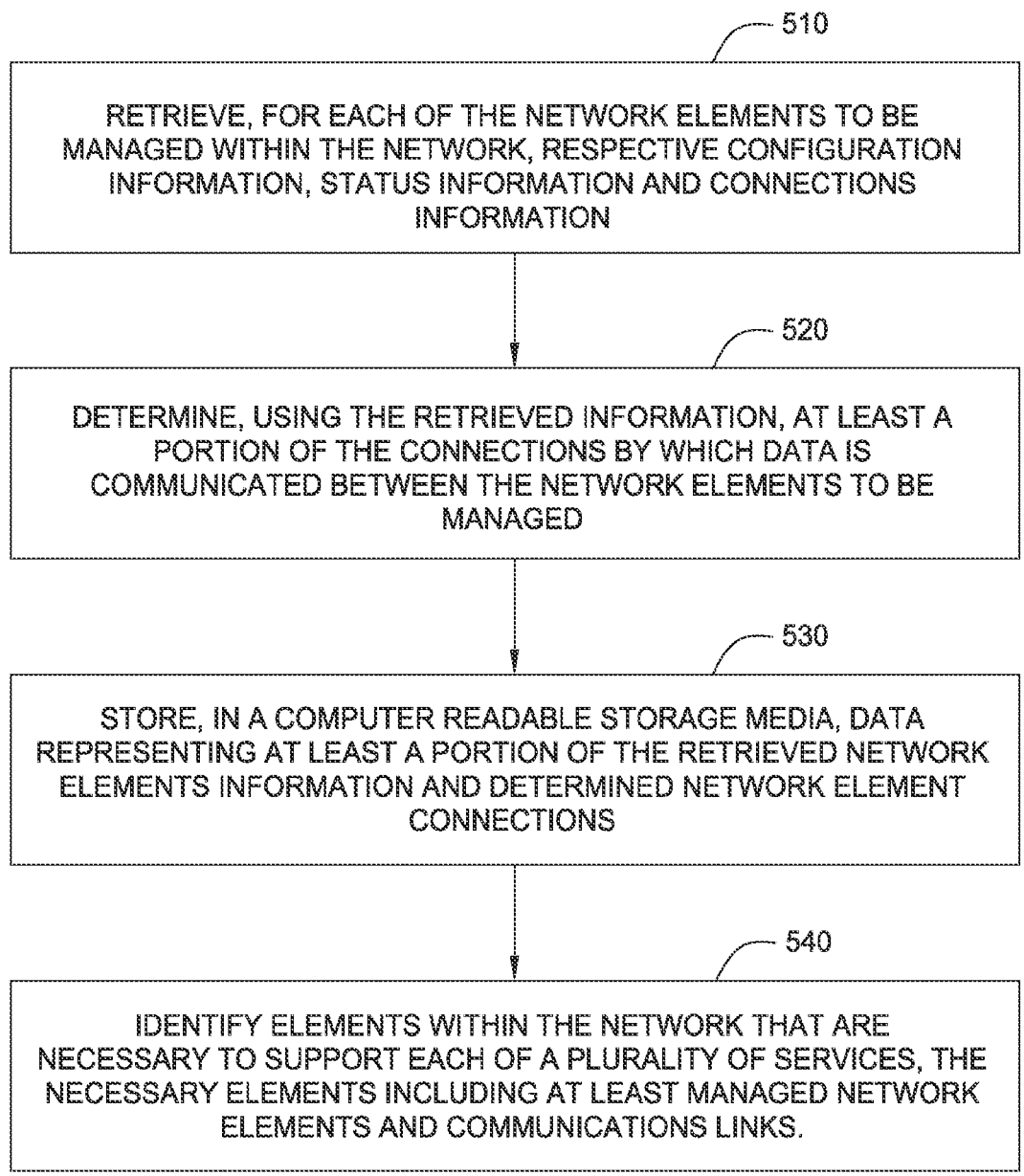
FIG. 5 depicts one embodiment of a method for performing an analysis function.

FIG. 5 depicts one embodiment of a method for performing an analysis function. Specifically, FIG. 5 depicts a flow diagram of a method 500 adapted for use in managing a network comprising a plurality of network elements.

At step 510, the method retrieves, for each of the network elements to be managed within the network, respective configuration information, status information and connections information.

At step 520, using the retrieved information, the connections or links by which data is communicated between a portion of or all of the network elements are determined.

At step 530, data representing at least a portion of the determined network element connections of the retrieved network element information is stored in a computer readable storage medium, such as a database or other memory element.

At step 540, the elements within the network that are necessary to support each of a plurality of services are identified, the identified network elements including this determination including at least managed network elements and communications links.

Although primarily described with respect to embodiments in which such management functions are performed by ANT 225, it will be appreciated that any of these management functions may be performed by one or more of other engines and/or tools of MS 140, one or more other management systems in communication with MS 140 (omitted for purposes of clarity), and the like, as well as combinations thereof.

The AUT 226 provides an audit capability for auditing LTE network 110. The AUT 226 enables proactive auditing of network infrastructure of LTE network 110 for identifying and handling network faults or potential network faults that are impeding or may impede end user traffic. Various embodiments of the AUT 226 are described in more detail in co-pending U.S. patent application Ser. No. 12/696,425, entitled "Method and Apparatus for Auditing 4G Mobility Networks"), which is hereby incorporated herein by reference in its entirety.

Briefly, the AUT 226 supports quick detection of network faults or potential network faults, impact analysis for determining the impact of faults or potential impact of potential network faults, and rectification of any network faults or potential network faults. The AUT 226 provides an ability to perform in-depth network health or sanity checks on LTE network 110 at any granularity level, e.g., for checking the health of ports, line cards, physical connectivity, logical connectivity, S* reference points, S* sessions, network paths, end-to-end mobile sessions of end users, and the like, as well as combinations thereof. The AUT 226 provides significant advantages in managing LTE networks, as such networks are inherently complex and, thus, highly susceptible to network faults that are often difficult to correlate to mobile subscriber data that has been packetized for transport over an IP network traversing multiple network elements that utilize different transport technologies and applied QoS policies.

In one embodiment, AUT 226 supports auditing of interconnectivity within LTE network 110. The auditing of interconnectivity may include proactively monitoring for connectivity, testing connectivity, and performing like auditing functions.

In one embodiment, auditing of interconnectivity within the LTE network 110 includes auditing interconnectivity between eNodeBs and EPC nodes of LTE network 110 (e.g., between eNodeBs 111, SGWs 112, PGW 113, MMEs 114, and PCRF 115, via the associated S* interfaces). In this embodiment, auditing of interconnectivity within the LTE network 110 includes auditing one or more EPS-related paths of LTE network 110.

The AUT 226 is capable of running tests on demand or on a schedule to determine whether the structure supporting the various paths is operating appropriately, such as within pre-define operational parameters indicative of appropriate operation (e.g., not over utilized, not too high a BER and so on).

In one embodiment, a preferred starting point for invoking the AUT 226 is the reference points terminated at the SGW (rather than at an eNodeB). It is known via the discovery/correlation processes that there are particular paths, connections, or services between the SGW and the eNodeBs it serves. It is further known whether the paths, connections, or services traverse other equipment, such as routers, switches and the like.

The AUT 226 may be used to test numerous parameters associated with the underlying infrastructure and or the path. Moreover, the testing may be performed in an incremental fashion from a first or initial reference point, where each subsequent infrastructure device within the path is subjected to testing from AUT 226. One simple test is to determine if the input ports and/or output ports associated with the infrastructure devices supporting the path are functioning or not functioning. This may be accomplished by sending query messages to each infrastructure device, by sending a test message or vector through the path and examining the test message or vector and each of a plurality of input/output ports.

In one embodiment, user guided processing by AUT 226 is provided. In this embodiment, user hints or other indicia of likely infrastructure topology is provided, such as where a third party/unmanaged portion of the network requires testing. In this context, a hint may comprise a suggestion or likely topology utilized by the third party within its portion of the network.

As described herein, in general, an EPS-related path is a path that is a transport mechanism that represents a peering relationship between two EPS reference points, where an EPS reference point is a termination point for any node of LTE network 110 that implements one or more of the protocols present in the 4G specification (e.g., using GTP, PM IP, or any other suitable protocols, and the like, as well as combinations thereof). As depicted and described herein, EPS reference points may include: for an eNodeB (S1-u, S1-MME, X2, and the like); for an SGW 112 (S1-u, S5/S8, S11, Gxs, and the like); for a PGW (S5/S8, SGi, SGx, S7, S2a, S2b, S2c, and the like); for an MME (S1-MME, S11, S10, and the like); and for a PCRF (S7). Thus, EPS-related paths correspond generally to the various S* sessions between the eNodeBs and EPC nodes (e.g., a path between an eNodeB 111 and an SGW 112 in the case of S1-u reference points, a path between an SGW 112 and PGW 113 in the case of S5/S8 reference points, a path between an eNodeB 111 and an MME 114 in the case of S1-MME reference points, and the like).

As described herein, EPS-related paths of LTE network 110 may be supported using any suitable underlying communications technologies. For example, an S1-u path between an eNodeB 111 and SGW 112 may be supported using a full IP/MPLS network which may include routers, switches, communication links, protocols, and the like. For example, an S5/S8 path between an SGW 112 and a PGW 113 may be supported using an IP mesh backhaul network that includes edge routers, core routers, communication links, protocols, and the like. The S* paths each may be supported using any suitable underlying communication technologies. In this embodiment, the auditing may include correlating different interconnection technologies and transport layers which support the respective S* sessions between EPC nodes of LTE network 110.

Figure 6:
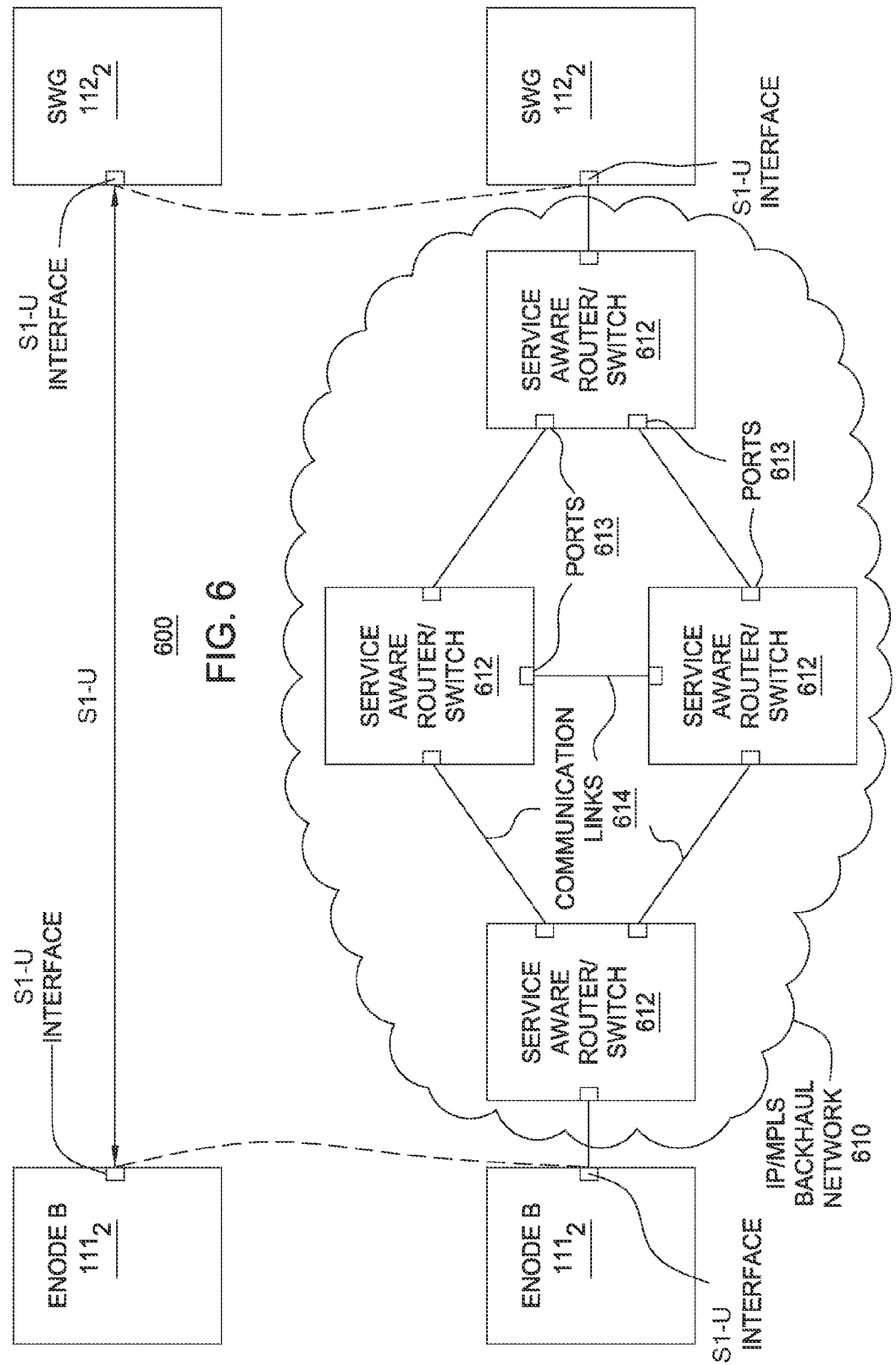
FIG. 6 depicts an exemplary EPS-related path of the LTE network of FIG. 1.

FIG. 6 depicts an exemplary EPS-related path of the LTE network of FIG. 1. As depicted in FIG. 6, the exemplary EPS-related path 600 is an S1-u path between an eNodeB and a SGW (illustratively, between eNodeB $111_2$ and SGW $112_2$). The exemplary EPS-related path 600 includes an S1-u interface $602_A$ on eNodeB $111_2$ and an S1-u interface $602_Z$ on SGW $112_2$. The exemplary EPS-related path 600 is supported using an IP/MPLS backhaul network 610, which is a mesh network including a plurality of service aware routers (SARs) and/or service aware switches (SASs) 612. The SARs/SASs 612 include ports 613, which typically have administrative and operational states associated therewith. The SARs/SASs 612 are interconnected via a plurality of communication links 614. It will be appreciated that exemplary EPS-related path 600 may be provided using any other communications technologies suitable for supporting paths between elements of LTE network 110.

The auditing of an EPS-related path may be performed in any suitable manner. In one embodiment, for example, auditing of an EPS-related path may include the steps of: (a) determining a current configuration of the path (e.g., performing processing of discovery information in DD 222 to determine the current configuration, requesting CE 223 to determine the current configuration, and the like, as well as combinations thereof), (b) obtaining the last known configuration of the path (e.g., from PD 224 information or any other suitable source of such information), (c) verifying the current configuration of the path against the last known configuration of the path, (d) if the current and last known configurations of the path match, initiating a test of the path at the LTE protocol level (e.g., initiating a GTP ping test, an MPIP ping test, or any other suitable test or tests depending on the protocol(s) being used to support the path), (e) if the protocol-level test of the path is successful, verifying the configuration of the IP interfaces, which may include verifying routing configuration, testing transport connectivity between the IP interfaces associated with the EPS reference points of the path at the IP level (e.g., using ICMP pings or other suitable testing capabilities), and the like, (f) if configuration of the IP interfaces is successful, verifying the administrative states of the ports, and (g) if the administrative states of the ports are verified successfully, verifying the operational states of the ports.

The TT 227 is configured to provide a mobile session trace capability. The mobile session trace capability enables a path of a mobile session of a UE to be traced through a wireless network. Various embodiments of the TT 227 are described in more detail in co-pending U.S. patent application Ser. No. 12/696,642, entitled "Method and Apparatus for Tracing Mobile Sessions"), which is hereby incorporated herein by reference in its entirety.

Briefly, the TT 227 enables a determination of the path of a mobile session through a wireless network and, optionally, determination of additional information associated with the mobile session. The mobile session trace capability enables wireless service providers to perform management functions based on the determined path of the mobile session through the wireless network.

The TT 227 is configured to determine the path of mobile sessions through LTE network 110. The TT 227 also may perform other functions associated with mobile sessions determined by TT 227, such as determining additional information associated with the mobile sessions, performing management functions for the mobile sessions, and the like, as well as combinations thereof.

The TT 227 may provide only the mobile session trace capability, or may provide the mobile session trace capability in addition to one or more other management functions. The TT 227 is configured to determine the path of a mobile session through a wireless network. The TT 227 also may be configured to perform additional functions for mobile sessions. For example, the TT 227 may be configured to determine additional information associated with mobile sessions, to correlate mobile session information to other information, to perform various management functions for mobile sessions(e.g., one or more of monitoring mobile sessions, diagnosing problems with mobile sessions, anticipating problems with mobile sessions, correcting problems with mobile sessions, and performing like management functions for mobile sessions), and the like. The TT 227 is optionally configured or adapted to perform various combinations of the functions described herein.

Although primarily depicted and described with respect to embodiments in which the functions of the mobile session trace capability are performed by TT 227, it will be appreciated that various functions of mobile session trace capability and/or in support of the mobile session trace capability may be performed by TT 227 in combination with one or more other engines and/or tools of MS 140, by one or more other engines and/or tools of MS 140 for providing information to TT 227 for use by TT 227 in providing various functions of the mobile session trace capability, and the like, as well as combinations thereof.

The TT 227 may be configured or adapted to perform broader management functions using information associated with mobile session path traces, such as diagnosing broader network problems, anticipating broader network problems, performing network optimization actions, and other management functions.

The FMT 228 provides various fairness management mechanisms adapted to controlling usage of network resources by mobile subscribers. Various embodiments of the FMT 228 are described in more detail in co-pending U.S. patent application Ser. No. 12/696,520, entitled "Method and Apparatus for Managing Mobile Resource Usage"), which is incorporated herein by reference in its entirety.

Briefly, the FMT 228 enforces appropriate resource (e.g., bandwidth) usage by customers, such as defined by service level agreements (SLAs) and the like. The fairness manager enforces appropriate bandwidth usage by any of a variety of enforcement mechanisms. The fairness manager is operative to enforce appropriate resource consumption levels associated with various users, groups of users, customers, third party network purchasers and the like, whether those levels are defined by agreement or acceptable practice.

The FMT 228 operates, in various embodiments, to identify one or more network elements experiencing congestion or likely to experience congestion in the near future.

In one embodiment, FMT 228 identifies congestion of a network element via detection of alarms (e.g., alarms associated with the network element, alarms associated with paths connected to the network element, and the like), via control messages received from one or more other modules (e.g., other tools of MS 140, other management systems, or any other suitable source(s) of such control messages), and the like, as well as combinations thereof. In one embodiment, FMT 228 receives alarms that are triggered based on active monitoring of network performance.

In one embodiment, FMT 228 identifies congestion of a network element in response to reports of service problems received from mobile subscribers. For example, a mobile subscriber calling to complain about poor Quality of Service (QoS) or a Quality-of-Experience (QoE), may provide the telephone number of the UE, which will be used by the network manager to look up the IMSI number associated with the UE, which may then be captured at MS 140 and used by MS 140 to determine the network elements that are or were supporting sessions for that UE. In one such embodiment, TT 227 is invoked in order to trace the mobile session path of the UE of complaining mobile subscriber (e.g., based on the IMSI of the UE, as described with respect to TT 227), which provides an indication as to the network elements that are or were supporting sessions for the UE of the complaining mobile subscriber. In one embodiment, one or more of the mechanisms of FMT 228 is configured to communicate with one or more other management systems for receiving information adapted for use in providing the various enforcement functions.

Generally speaking, various embodiments enable a user, such as a user in a network operations center (NOC), utilizing a computer terminal or other user workstation with a graphical user interface (GUI) interact with the management system/software and thereby to "drill down" deeper from upper to lower hierarchical level path elements by displaying lower level path elements associated with upper level path elements selected by a user via a user interface.

In one embodiment, mobile session path information is displayed by generating a "sub-map" including only the network components that support the mobile session and displaying the generated sub-map. For example, where the graphical display of the wireless network includes many eNodeBs, SGWs, and PGWs, the sub-map for a mobile session will include only one of each of those elements, as well as the sessions between each of those elements, thereby highlighting which network elements of the wireless network are supporting the mobile session.

In this example, the sub-map may be displayed in any suitable manner (e.g., simultaneously in a window in a different portion of a window in which the wireless network is displayed, in a new window opened for purposes of displaying the sub-map, and the like). In this example, as in the previous example, the mobile session path, or even components and sub-components of the mobile session path (e.g., physical equipment, physical communication links, sub-channels on physical communication links, and the like), may be selectable such that, when selected by the user, the user is presented with additional mobile session path information associated with the mobile session.

From such examples, it will be appreciated that display of additional information associated with a mobile session path may be provided in any suitable manner (e.g., refreshing within the display window to include mobile session path information, opening a new window including mobile session path information, and the like, as well as combinations thereof).

Implementations of the various methods optionally yield logical and/or physical representations of one or more paths, underlying transport elements supporting the one or more paths, as wells as various protocols, hardware, software, firmware, domains, subnets, network element, and/or sub-element connections as discussed herein. Any of these physical and/or logical representations may be visually represented within the context of a graphical user interface (GUI). Moreover, the various interactions and correspondences between these physical and/or logical representations may also be visually represented, included representations limited to specific criteria, such as those representations "necessary to support a path", "necessary to support a client/customer", "associated with a single client/customer" and so on. Such graphical representations and associated imagery provide infrastructure views (i.e., from the perspective of one or more transport elements) or services views (i.e., from the perspective of one or more services) of the network in either a static or dynamic manner.

A computer suitable for use in performing the functions described herein may include, illustratively, a processor element (e.g., a central processing unit (CPU) and/or other suitable processor(s)), a memory (e.g., random access memory (RAM), read only memory (ROM), and the like), a management module/processor, and various input/output devices (e.g., a user input device (such as a keyboard, a keypad, a mouse, and the like), a user output device (such as a display, a speaker, and the like), an input port, an output port, a receiver/transmitter (e.g., network connection or other suitable type of receiver/transmitter), and storage devices (e.g., a hard disk drive, a compact disk drive, an optical disk drive, and the like)). In one embodiment, computer software code associated with methods for invoking the various embodiments can be loaded into the memory and executed by processor to implement the functions as discussed herein above. The computer software code associated with methods for invoking the various embodiments can be stored on a computer readable storage medium, e.g., RAM memory, magnetic or optical drive or diskette, and the like.

It should be noted that functions depicted and described herein may be implemented in software and/or in a combination of software and hardware, e.g., using a general purpose computer, one or more application specific integrated circuits (ASIC), and/or any other hardware equivalents.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible fixed or removable media, transmitted via a data stream in a tangible or intangible broadcast or other signal bearing medium, and/or stored within a memory within a computing device operating according to the instructions.

Although primarily depicted and described herein with respect to embodiments in which the management capability is used for managing an LTE wireless network, it will be appreciated that the management capability may be used for managing other types of wireless networks, including, but not limited to, other types of 4G wireless networks, 3G wireless networks, 2.5G wireless networks, 2G wireless networks, and the like, as well as combinations thereof.

In one embodiment, for example, in which the management capability is used to manage a Code Division Multiple Access (CDMA) 2000 Evolution—Data Optimized (EVDO) network, the management capability may support management of the network from the IP core network to the Base Transceiver Station (BTS) to which the UE connects.

In one embodiment, for example, in which the management capability is used to manage a Universal Mobile Telecommunications System (UMTS) network, the management capability may support management of the network from the IP core network to the eNodeB to which the UE connects.

In one embodiment, for example, in which the management capability is used to manage a General Packet Radio Service (GPRS) network, the management capability may support management of the network from the IP core network to the Base Transceiver Station (BTS) to which the UE connects.

It will be appreciated that, since the management capability may be used to manage different types of wireless networks that employ different types of network elements, the LTE-specific terminology used herein in describing the management capability within the context of an LTE network may be read more generally. For example, references herein to PGWs of the LTE network (and, similarly, PDSNs in CDMA2000 EVDO networks, SGSNs in UMTS/GPRS networks, and the like) may be read more generally as core network gateways. For example, references herein to SGWs of the LTE network (and, similarly, RNCs in CDMA2000 EVDO and UMTS networks, BSCs in GPRS networks, and the like) may be read more generally as radio network controllers. For example, references herein to eNodeBs of the LTE network (and, similarly, BTSs in CDMA2000 EVDO and GPRS networks, eNodeBs in UMTS networks, and the like) may be read more generally as wireless access nodes. Similarly, other LTE-specific terminology used herein in describing the management capability within the context of an LTE network also may be read more generally.

In various embodiments, enhanced services are provided using one or both of the 7750 Service Router or 7705 Service Aggregator Router (SAR), both of which are manufactured by Alcatel-Lucent of Murray Hill, N.J. The 7750 Service Router is adapted to facilitate and support paths between a large number of eNodeBs and a SGW, or between one or more 7705 SARs and a SGW.

The 7705 SAR is adapted to aggregate multiple eNodeBs into one focal point and relays the traffic back to a 7750 Service Router or a SGW. That is, 7705 SAR concentrates and supports traffic/ paths between the aggregated eNodeBs and either or both of a 7750 Service Router or a SGW.

Either of the 7750 Service Router and 7705 SAR may be included within the various network topologies discussed above with respect to the various figures. For example, the 7750 Service Router may be used to implement the service aware routers/switches of the various Figures. Moreover, the various networks described in the Figures may be modified to include one or more 7705 SARs to aggregate multiple eNodeBs connected to the service aware routers/switches.

A network manager according any of the various embodiments may be implemented using the Model 5620 Service Aware Manager (SAM) manufactured by Alcatel-Lucent. The 5620 SAM implements various management functions suitable for use in, for example, a network operations center (NOC) supporting one or more a telecommunications networks, such as wireless telecommunications networks. The 5620 SAM provides an up to date view of each of the elements and sub-elements forming the managed network. All of these elements may be discovered by the 5620 SAM as discussed in more detail above.

A general implementation for network operators transitioning from a prior network management system to a service aware management system may comprise, illustratively, (1) adapting an existing network structure to include new functional elements to accomplish changing goals/needs of customers, such as adding new functional elements such as the 7750 Service Router and/or 7705 SAR switching elements between one or more SGWs and at least a portion of their respective eNodeBs; (2) discovering the various configuration, status/operating and connections information associated with all the network elements, sub-elements and links forming the network; (3) correlating the network infrastructure to the various paths supported within the network; and (4) managing the network infrastructure using the path-based management tools discussed herein.

Various embodiments are adapted to provide a self-organizing network (SON) within the context of an existing wireless network architecture and/or a future wireless network architecture.

In at least some embodiments, a SON is configured by building intelligence and automation into the network to enable network operators to address various challenges associated with operation of the network. In general, a SON provides a network operator with a path to increase (and, in at least some cases maximize) network performance with less effort (and, thus, lower cost).

In at least some embodiments, a SON enables reductions in Operating Expenditure (OPEX) by enabling avoidance of time-consuming and repetitive tasks, avoiding drive tests, providing process simplification, or the like, as well as various combinations thereof.

In at least some embodiments, a SON enables relatively rapid adaptation to network conditions by avoiding error-prone and slow manual operations, providing real-time adaptation of the network based on available network information, or the like, as well as various combinations thereof.

In at least some embodiments, a SON enables increases in network quality (e.g., by providing higher end-user quality of experience, ensuring service continuity, embedding system and product expertise in the network, and the like).

In at least some embodiments, various capabilities discussed herein may be particularly well-suited where many access nodes (e.g., NodeBs, eNodeBs, or the like) are added to or deleted from the network, such as when a convention or other event that requires increased capacity for a short period of time occurs. In general, the various teachings described herein enable rapid scale-up and scale-down of network resources in accordance with user requirements and/or other factors.

Although primarily depicted and described herein within the context of implementing embodiments of a SON within a specific type of wireless communication network (namely, an LTE network), various embodiments of SON may be implemented in various other types of communication networks (e.g., 2G networks, 3G networks, future wireless networks, or the like, as well as various combinations thereof).

Figure 7:
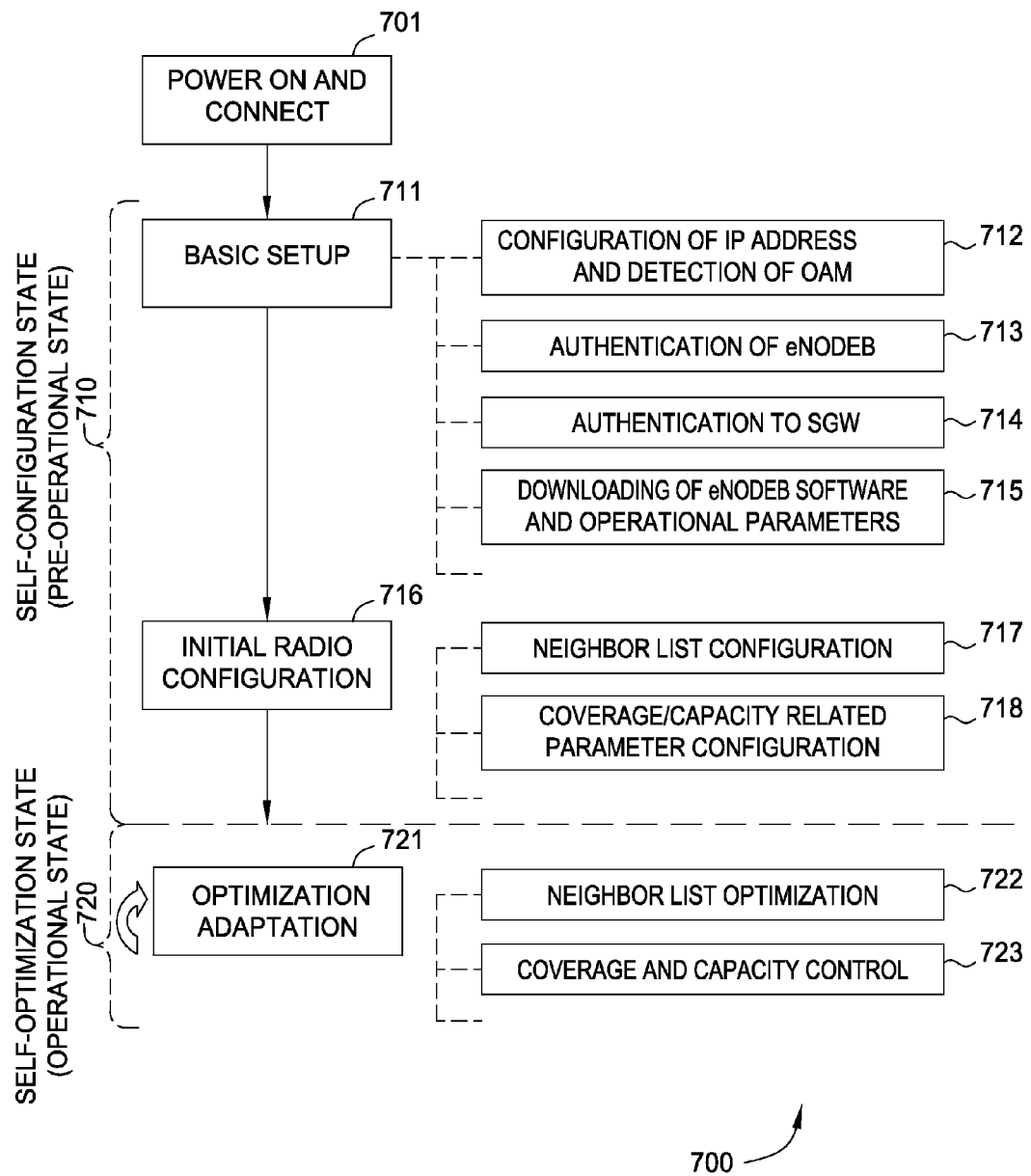
FIG. 7 depicts an exemplary embodiment of a method for self-configuration and self-optimization of a network via an eNodeB.

FIG. 7 depicts an exemplary embodiment of a method for self-configuration and self-optimization of a network via an eNodeB.

As depicted in FIG. 7, method 700 includes (1) an initial step 701 of powering on the eNodeB and/or connecting the eNodeB to the network, (2) a self-configuration state (pre-operational state) 710 including a basic setup step 711 and an initial radio configuration step 716, and (3) a self-optimization state (operational state) 720 including an optimization/adaptation step 721.

The self-configuration state (pre-operational state) 710 may include basic set-up of the eNodeB and initial radio configuration of the eNodeB. The self-configuration state (pre-operational state) 710 may be performed when the eNodeB is powered up and has backbone connectivity, but the RF interface of the eNodeB is turned off. The self-configuration state (pre-operational state) 710 may include automatic installation procedures in order to provide a basic configuration of the eNodeB for system operation of the eNodeB.

The self-optimization state (operational state) 720 may include various optimization and adaptation functions. The self-optimization state (operational state) 720 may be performed when the pre-operational state is complete (i.e., steps 711 and 716 have been completed) and the RF interface of the eNodeB is turned on. The self-optimization state (operational state) 720 may include using UE and eNodeB measurements and performance measurements to auto-tune portions of the network.

At step 701, the eNodeB is powered on and/or connected to the network (e.g., via a backbone connection). For example, the eNodeB may already be connected to the network and may simply need to be powered on. Similarly, for example, the eNodeB may already be powered on and may simply need to be connected to the network. In some cases, both actions may need to be performed.

At step 711, while in the self-configuration state (pre-operational state) 710, basic setup of the eNodeB is performed. As depicted in FIG. 7, basic setup of the eNodeB may include a number of functions. As depicted in box 712, for example, basic setup of the eNodeB may include configuration of one or more IP addresses and detection of an Operations, Administration, and Maintenance (OAM) capability (e.g., an OAM server with which the eNodeB may communicate). As depicted in box 713, for example, basic setup of the eNodeB may include authentication of the eNodeB with the network. As depicted in box 714, for example, basic setup of the eNodeB may include association of the eNodeB to at least one gateway (e.g., an SGW). As depicted in box 715, for example, basic setup of the eNodeB may include downloading and installation of eNodeB software (and, optionally, operational parameters) for the eNodeB.

At step 716, while in the self-configuration state (pre-operational state) 710, an initial radio configuration for the eNodeB is performed. As depicted in box 717, for example, initial radio configuration for the eNodeB may include configuration of a neighbor list for the eNodeB. As depicted in box 718, for example, initial radio configuration for the eNodeB may include configuration of coverage/capacity related parameters for the eNodeB.

At step 721, while in the self-optimization state (operational state) 720, optimization and adaption functions are performed. As depicted in box 722, for example, the optimization and adaption functions may include neighbor list optimization. As depicted in box 723, for example, the optimization and adaption functions may include coverage and capacity control.

Figure 8:
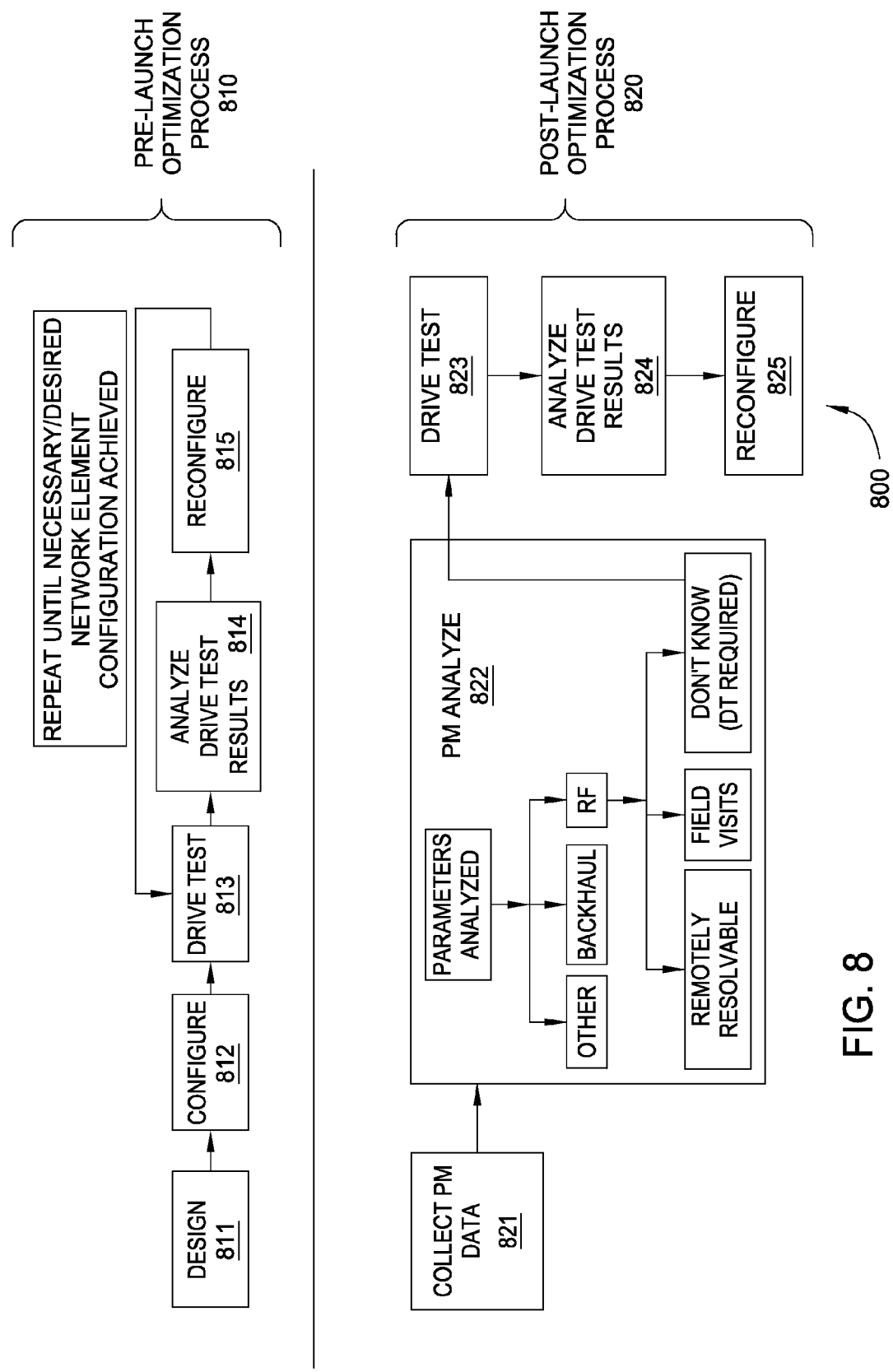
FIG. 8 depicts exemplary pre-launch and post-launch optimizations associated with configuration of elements within a network.

FIG. 8 depicts exemplary pre-launch and post-launch optimizations associated with configuration of elements within a network.

As depicted in FIG. 8, a pre-launch optimization process 810 is configured to optimize configuration of a network element before the network element begins operating within the network. At step 811, a design of the network element configuration is determined. The design of the network element configuration may specify configuration of one or more features or functions of the network element (e.g., features and/or functions necessary and/or desirable for the network element during operation of the network element). At step 812, the network element is configured based on the determined design of the network element configuration. At step 813, a drive test is performed to test whether the network element is operating according to the determined design of the network element configuration. At step 814, the drive test results are analyzed. The drive test results may be analyzed to determine whether or not the design of the network element configuration has been achieved. At step 815, if a determination is made that the design of the network element configuration has not been achieved, the network element is reconfigured to attempt to meet the determined design of the network element configuration. From step 815, pre-launch optimization process 810 returns to step 813, at which point another drive test is initiated. As indicated in FIG. 8, pre-launch optimization process 810 is configured such that steps 813, 814, and 815 may be repeated until the determined design of the network element configuration is achieved (i.e., until the necessary and/or desired configuration of the network element has been achieved such that the network element may then be put into operation). It is noted that the pre-launch optimization process 810 may be performed for the network element as a whole and/or repeated for specific sub-elements/functions of the network element.

As depicted in FIG. 8, a post-launch optimization process 820 is configured to optimize configuration of a network element while the network element is operating within the network. At step 821, performance measurement (PM) data is collected from the network element. The PM data may be collected from the network element remotely (e.g., by a management system configured to perform post-launch optimization process 820). At step 822, the PM data is analyzed. As depicted in FIG. 8, analysis of PM data may include analysis of one or more features/functions of the network element based on PM data relevant to the one or more features/functions of the network element. For example, in the exemplary case of an eNodeB (as is depicted in FIG. 8), such features/functions may include operation of the RF interface of the eNodeB (depicted as RF in FIG. 8), operation of the back call interface of the eNodeB (depicted as BACKHAUL in FIG. 8), and/or other features/functions (depicted as OTHER in FIG. 8). As further depicted in FIG. 8, analysis of PM data may result in identification of issues and/or potential issues relating to the operation of one or more of the features/functions of the network element and, further, may include a determination of the manner in which the issues/potential issues may be resolved. As further depicted in FIG. 8, for example, the determination of the manner in which an issue/potential issue may be resolved may include determining whether the issue/potential issue is remotely resolvable, whether the issue/potential issue requires a field visit, or whether testing should be initiated (e.g., in the form of one or more drive tests (DTs) as depicted in FIG. 8). When testing should be initiated for testing of a particular feature/function of the network element in view of the analysis of the PM data, post-launch optimization process 820 proceeds to steps 823, 824, and 825, such that one or more drive tests (DTs) may be used to determine reconfiguration of the network element in view of the issue/potential issue identified for the particular feature/function of the network element. At step 823, a drive test is performed to test whether the network element is operating according to the expected network element configuration. At step 824, the drive test results are analyzed. The drive test results may be analyzed to determine whether or not the network element is operating according to the expected network element configuration. At step 825, if a determination is made that the network element is not operating according to the expected network element configuration, the network element is reconfigured to attempt to meet the expected network element configuration. From step 825, post-launch optimization process 810 may return to step 823 (omitted for purposes of clarity), at which point another drive test is initiated (i.e., steps 823, 824, and 825 may be repeated until the network element is reconfigured to attempt to meet the expected network element configuration). It is noted that the post-launch optimization process 820 may be performed for the network element as a whole and/or repeated for specific sub-elements/functions of the network element. It is noted that the post-launch optimization process 820 may be repeated as often as necessary and/or desired (e.g., in response to detection of one or more conditions, periodically, or the like, as well as various combinations thereof).

In at least some embodiments, a SON provides one or more of self-configuration functions, self-optimization functions, self-healing functions, or the like, as well as various combinations thereof. For example, the self-configuration functions of a SON may include one or more of configuration of network connections, software downloads, database updates, physical cell identification (PCI) configuration, neighbor recognition, or the like, as well as various combinations thereof. For example, self-optimization functions of a SON may include one or more of load-balancing optimization, handoff optimization, interference coordination, capacity optimization, coverage optimization, energy savings optimization, or the like, as well as various combinations thereof. For example, self-healing functions of a SON may include one or more of outage detection/compensation, multi-homing, or the like, as well as various combinations thereof. It is noted that the foregoing SON functions may be organized and used in various other arrangements. It is further noted that various embodiments of a SON may support various other functions.

In one embodiment, a physical cell identifier (PCI) configuration function is supported. In general, a Physical Cell Identifier (PCI) of a cell needs to be collision free and confusion free. In most cases, only 504 unique PCIs are available and, as a result, at least some of the PCIs must be recycled among the cells in a manner preventing collisions and confusion. In one embodiment, assignment of PCIs to cells is determined during planning via a planning tool and the assignment of the PCIs to the cells is configured into the eNodeBs. The assignment of the PCIs to the cells may be configured into the eNodeBs in any suitable manner, such as via a management system (e.g., an Element Management System (EMS)), via use of configuration files, or the like, as well as various combinations thereof). In one embodiment, the PCI configuration function may be used to assign a PCI to a newly installed eNodeB.

In one embodiment, an automatic neighbor relationship function is supported. In one embodiment, the automatic neighbor relationship function may be used by a newly installed eNodeB to automatically recognizing any neighboring eNodeBs. An exemplary embodiment of a method for performing automatic neighbor relationship management is depicted and described with respect to FIG. 9.

Figure 9:
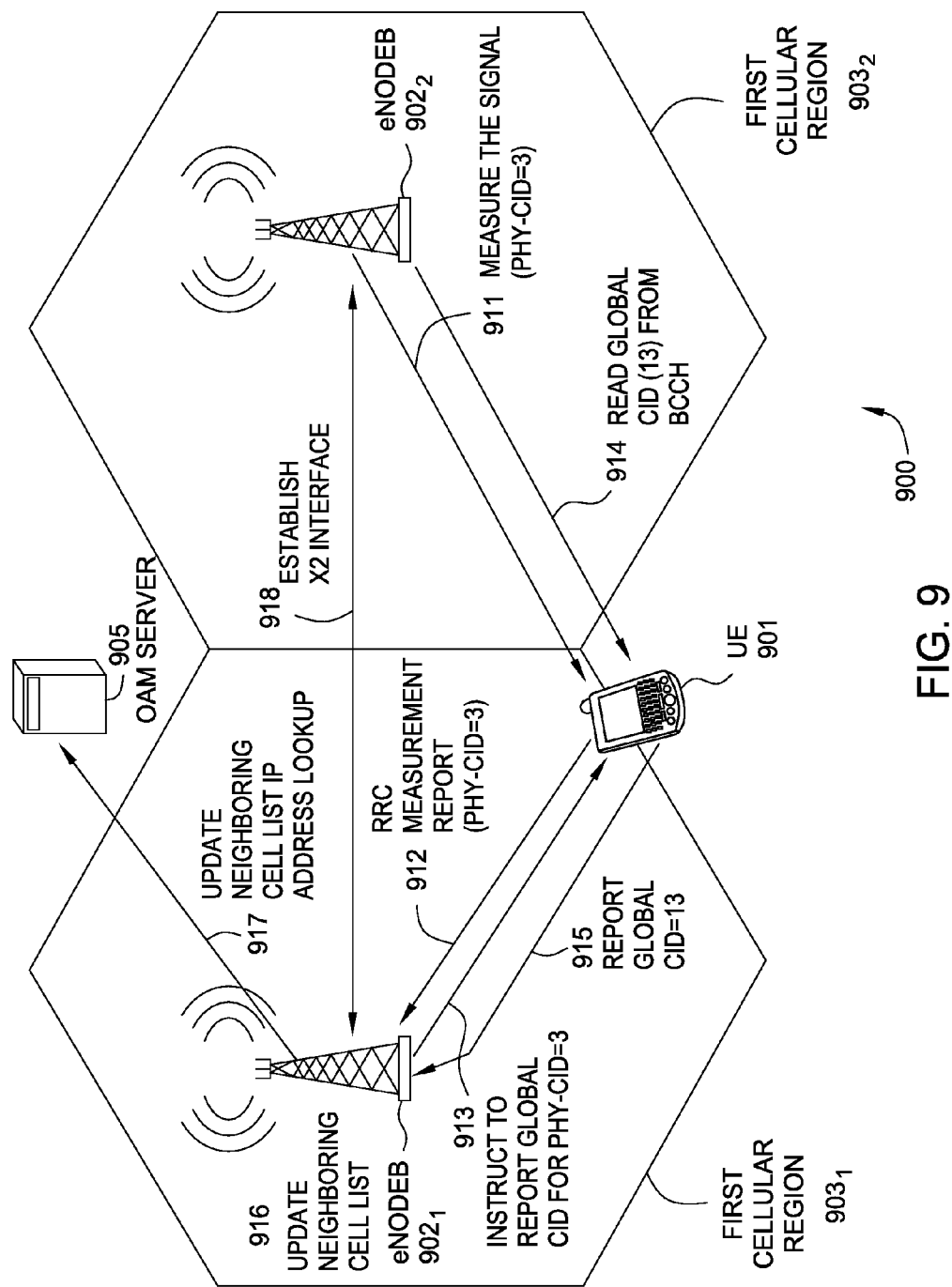
FIG. 9 depicts an exemplary embodiment of a method for performing automatic neighbor relationship management at an eNodeB.

FIG. 9 depicts an exemplary embodiment of a method for performing automatic neighbor relationship management at an eNodeB.

As depicted in FIG. 9, a UE 901 is in the vicinity of a first eNodeB $902_1$ (having an associated first cellular region $903_1$) and a second eNodeB $902_2$ (having an associated second cellular region $903_2$, which has a PCI=3) such that UE 901 is able to communicate with first eNodeB $902_1$ and second eNodeB $902_2$. The first eNodeB $902_1$ and the second eNodeB $902_2$ each are configured to communicate with an OAM server 905.

At step 911, UE 901 measures the signal from second eNodeB $902_2$.

At step 912, UE 901 sends a Radio Resource Control (RRC) Measurement Report to first eNodeB $902_1$. The RRC Measurement Report includes the PCI of second cellular region $903_2$ (i.e., PCI=3).

At step 913, first eNodeB $902_1$ sends a message to UE 901, where the message is configured to instruct UE 901 to read the E-UTRAN Cell Global Identifier (ECGI) for the discovered PCI of second cellular region $903_2$ (i.e., the message sent from first eNodeB $902_1$ to UE 901 includes the discovered PCI of second cellular region $903_2$ (i.e., PCI=3)) as a parameter.

At step 914, UE 901 reads the ECGI (e.g., Global CID=13) from the Broadcast Control Channel (BCCH) of the second eNodeB $902_2$ of the second cellular region $903_2$.

At step 915, UE 901 sends a message to the first eNodeB $902_1$, where the message is configured to report the ECGI (e.g., Global CID=13) of the second cellular region $903_2$.

At step 916, UE 901 updates to its neighboring cell list to include the second eNodeB $902_2$ of the second cellular region $903_2$.

At step 917, UE 901 sends a message to OAM server 905, where the message is configured to inform OAM server 905 of the updating of the neighboring cell list of the first eNodeB $902_1$ (e.g., such that OAM server 905 may then update the neighboring cell list of the first eNodeB $902_1$ that is maintained on OAM server 905).

At step 918, an X2 interface is established between the first eNodeB $902_1$ and the second eNodeB $902_2$.

In one embodiment, one or more load-balancing functions may be supported.

In one embodiment, a load-balancing function may be configured to balance load between access nodes. This function may be used to balance load between access nodes of a homogenous network (e.g., between NodeBs of a 3G network, between eNodeBs of an LTE network, and the like) or a heterogeneous network. In one embodiment, for example, each eNodeB monitors load in its respective cell and exchanges the load information with its neighboring eNodeBs (e.g., via X2 or S1 interfaces), such that load-balancing between the eNdoeBs may be used to distribute the load of the UEs across the eNodeBs. In one embodiment, the load information may be used to delay or advance handing over of UEs between cells.

In one embodiment, a load-balancing function may be configured to balance load between layered heterogeneous networks (e.g., between 3G and LTE networks, such as where service providers are transitioning from 3G to LTE). This may be used independent of or in conjunction with the load-balancing function configured to balance load between access nodes (e.g., between NodeBs of a 3G network, between eNodeBs of an LTE network, between NodeBs of a 3G network and eNodeBs of an LTE network, or the like). An exemplary embodiment of inter-RAT load-balancing is depicted and described with respect to FIG. 10.

Figure 10:
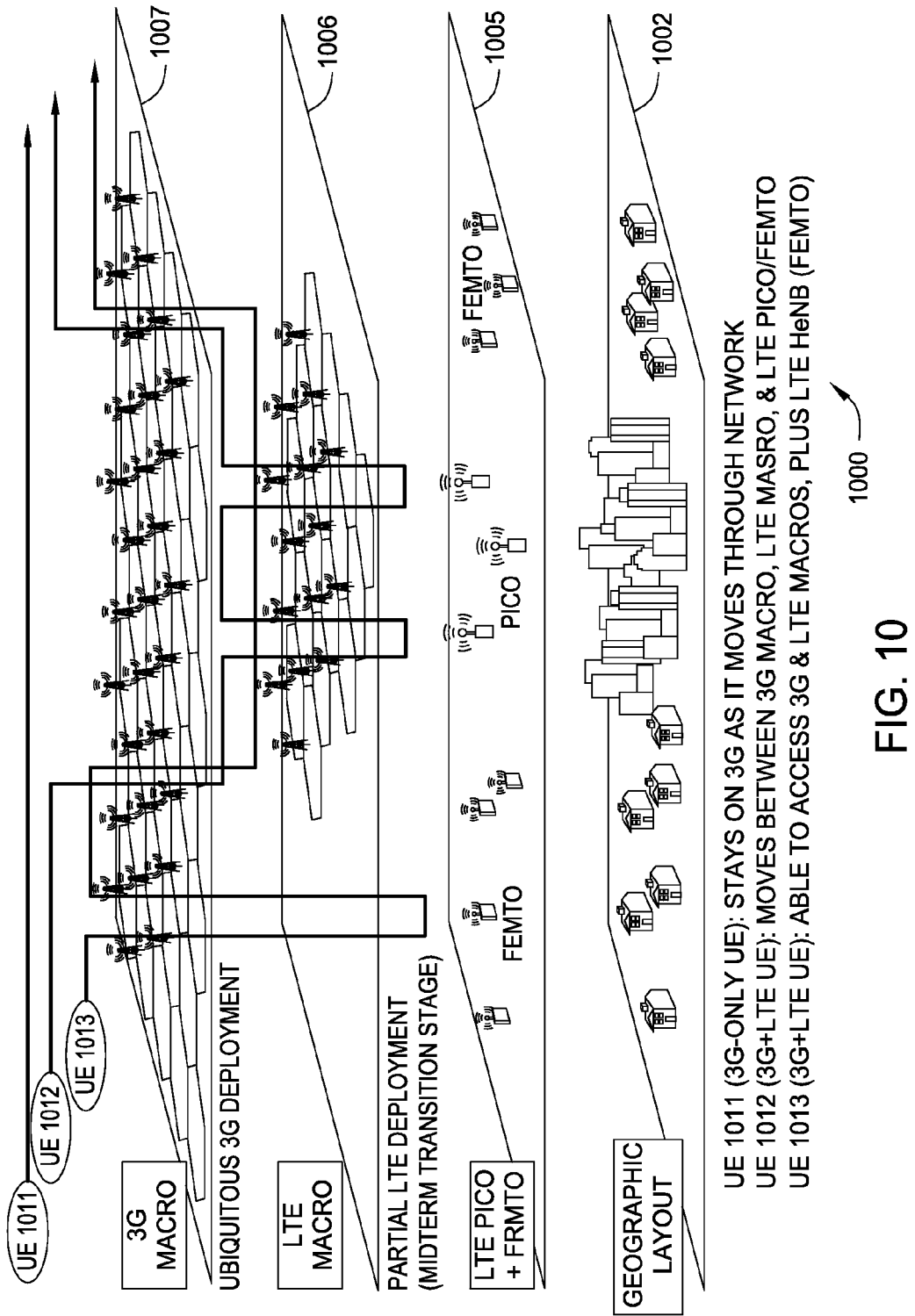
FIG. 10 depicts an exemplary embodiment of inter-RAT load-balancing for different types of UEs in a wireless communication system.

FIG. 10 depicts an exemplary embodiment of inter-RAT load-balancing for different types of UEs in a wireless communication system.

As depicted in FIG. 10, a wireless communication system 1000 is deployed in a geographic area having a geographic layout 1002. The geographic layout 1002 has three types of cellular networks (supporting three different RATs) deployed therein, including an LTE PICO+FEMTO network 1005, an LTE Macro network 1006, and a 3G Macro network 1007.

As depicted in FIG. 10, UEs moving through the geographic area may or may not switch between the available cellular networks depending on various factors (e.g., whether or not the UE is configured to support multiple RATs, inter-RAT handoff policies and rules, or the like, as well as various combinations thereof). More specifically, FIG. 10 depicts the handoffs of three specific UEs (illustratively, UEs 1011, 1012, and 1013) as the UEs move through the geographic area. The UE 1011 is a single mode UE which only includes support for access to 3G networks and, thus, UE 1011 stays on 3G Macro network 1007 the entire time as it moves through the geographic area. The UE 1012 is a dual-mode UE (including support for access to 3G networks and LTE networks) and, thus, UE 1012 moves between 3G Macro network 1007, LTE Macro network 1006, and LTE PICO+FEMTO network 1005 as it moves through the geographic area. The UE 1013, like UE 1012, is a dual-mode UE (including support for access to 3G networks and LTE networks) and, thus, UE 1013 moves between 3G Macro network 1007, LTE Macro network 1006, and LTE PICO+FEMTO network 1005 as it moves through the geographic area (although the handoffs are different than for UE 1012).

In one embodiment, a load-balancing function may be configured to balance load within the context of multiple carriers, such as where normally competing carriers cooperate in particular geographic regions where one or the other carrier has insufficient resources. For example, carrier A may augment the apparent capacity of carrier B in a first location in exchange for carrier B augmenting the apparent capacity of carrier A in a second location.

It is noted that this layered type of load-balancing may be enabled by sharing various types of information (e.g., configuration, load, capacity, or the like, as well as various combinations thereof) between access nodes of various layers and technologies (e.g., between one or more of base stations, NodeBs, eNodeBs, or the like, as well as various combinations thereof). In this manner, advantages such as seamless handoff between 3G and 4G networks may be provided for those user devices capable of supporting both types of network.

In various embodiments, each eNodeB shares its table data with each of its neighboring eNodeBs. For example, information pertaining to a newly installed eNodeB may be provided to a neighboring eNodeB via a network management system or an X2 connection. For example, a newly installed eNodeB may communicate discovery signals towards neighbor nodes to initiate data exchange. In one embodiment, an eNodeB may monitor its own user load level and, optionally, also may assist with user load level monitoring for one or more of its neighbor eNodeBs. With loading data derived thereby, the various eNodeBs in a particular geographic area they share the user load as appropriate.

It is noted that various other load-balancing functions may be used within SONs.

In one embodiment, robustness optimization may be supported in conjunction with one or more of the load-balancing capabilities. In one embodiment, for example, a SON may be configured to detect and correct various types of handover problems (e.g., connection failures due to intra-LTE mobility, unnecessary handoffs from one RAT to another RAT, or the like). It is noted that handoff failure categories may include failures due to handoff triggering that is performed too early and/or failures due to handoff triggering that is performed too late. In one embodiment, for example, a SON may be configured to identify failed and/or unnecessary handoffs and, further, to suggest changes in handoff parameters. In one embodiment, for example, a SON may be configured to reduce inefficient use of network resources due to unnecessary handoffs. In one embodiment, the handoff of users between eNodeBs is managed in a manner tending to reduce connection failures or overtaxing of available resources. In one embodiment, handoff related failures are monitored and information derived by such monitoring is used to proactively manage user handoffs in a manner tending to reduce such failures.

It is noted that various combinations of such load-balancing capabilities may be used in combination with each other to support load-balancing at any suitable granularity.

In one embodiment, an Inter-Cell Interference Coordination (ICIC) function may be supported. The ICIC function may be configured to improve interference limitations found in cellular systems deployed with universal reuse. The ICIC function may be configured to reduce interference on the uplink (e.g., via soft fractional frequency reuse, fractional frequency reuse, or the like) and/or the downlink (e.g., via power limitations on frequency blocks or the like). The ICIC function may utilize optimization of one or more antenna parameters (e.g., tilt, azimuth, or the like, as well as various combinations thereof). In one embodiment, resource blocks defined in terms of time and frequency are allocated to various eNodeBs for use within one or more sectors of their coverage areas, respectively. In one embodiment, a first plurality of frequencies is operated at low power in all cell sectors of an eNodeB such that user equipment within a predefined distance in any direction from the eNodeB may communicate using any of the first plurality of frequencies, and the remaining frequencies are divided into spectral groups and assigned such that neighboring eNodeBs operate in a manner tending to avoid overlapping spectral groups between eNodeB coverage areas. It is noted that various embodiments of the ICIC function may improve user throughput and, thus, improve customer experience. An exemplary embodiment of ICIC is depicted and described with respect to FIG. 11.

Figures 11, 12:
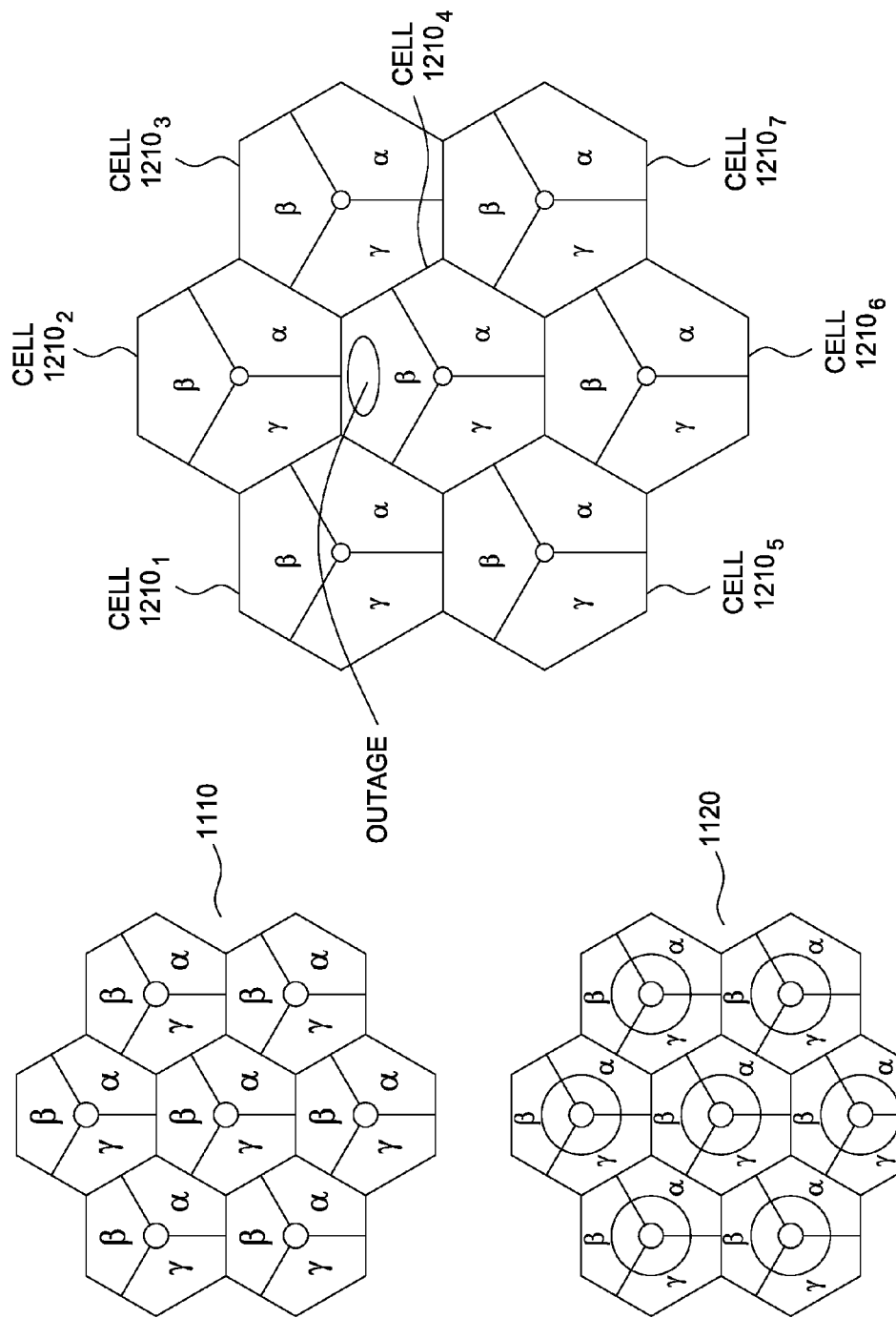
FIG. 11 depicts an exemplary embodiment of Inter-Cell Interference Coordination (ICIC)
FIG. 12 depicts an exemplary embodiment of cell outage detection and compensation.

FIG. 11 depicts an exemplary embodiment of Inter-Cell Interference Coordination (ICIC). As depicted in FIG. 11, a first set of cells 1110 employs frequency reuse and a second set of cells 1120 employs fractional frequency reuse. In the first set of cells 1120, resource blocks defined in terms of time and frequency are allocated to the various eNodeBs of the cells 1110 for use within one or more sectors of their coverage areas, respectively (illustratively, where adjacent sectors of adjacent cells 1110 use non-overlapping frequencies). In the second set of cells 1120, a first plurality of frequencies is operated at low power in all cell sectors of an eNodeB such that user equipment within a predefined distance in any direction from the eNodeB may communicate using any of the first plurality of frequencies, and the remaining frequencies are divided into spectral groups (illustratively, three spectral groups each) where neighboring eNodeBs operate in a manner tending to avoid overlapping spectral groups between eNodeB coverage areas. As noted above, other types of features may be used to provide the ICIC function in SONs.

In one embodiment, coverage and/or capacity optimization functions may be supported. In one embodiment, coverage and/or capacity optimization functions may be configured to support the ability of the users to establish and maintain connections with acceptable or default service quality. It is noted that this may imply that coverage for the users is continuous and that the users are unaware of cell borders. It is further noted that coverage includes both idle and active modes for both the uplink and downlink. In one embodiment, coverage and/or capacity optimization functions may be configured such that coverage optimization has a higher priority than capacity optimization. In one embodiment, coverage and/or capacity optimization functions may be configured to support optimization of parameters through analysis of call trace data. In one embodiment, coverage and/or capacity optimization functions may be configured to minimize the number of drive tests performed in the network. In one embodiment, by utilizing data from UEs associated with one or more coverage areas, the operation of the eNodeBs in the various coverage areas may be optimized in terms of power consumption, transmission strength, user experience, or the like, as well as various combinations thereof.

In one embodiment, an energy savings optimization function may be supported. In one embodiment, the energy saving optimization function may support switching a power mode (e.g., active mode and one or more other modes) of an element of a wireless access node. In one embodiment, the energy saving optimization function may support switching between active mode and one or more other modes (e.g., idle mode, off mode, or the like) at various levels of granularity. In one embodiment, for example, switching between active mode and one or more other modes may be supported at the component level (e.g., for a Central Processing Unit (CPU), for a Field-Programmable Gate Array (FPGA), or the like). In one embodiment, for example, switching between active mode and one or more other modes may be supported at the board level (e.g., for a modem or the like). In one embodiment, for example, switching between active mode and one or more other nodes may be supported at the cell level (e.g., for a carrier or the like). In one embodiment, for example, switching between active mode and idle mode may be supported at the site level (e.g., for an access node). It is noted that such switching may be performed at various combinations of such elements and/or sub-elements. The switching of an element or sub-element from active mode to idle/off mode will reduce power consumption and may result in additional benefits (e.g., interference reduction or the like).

In one embodiment, a cell outage detection and compensation function is supported.

In one embodiment, the cell outage detection and compensation function is configured to detect cell outages (e.g., in a cell of an eNodeB supporting the cell outage detection and compensation function, in surrounding cells of neighboring eNodeBs which are neighbors of an eNodeB supporting the cell outage detection and compensation function), or the like, as well as various combinations thereof.

In one embodiment, the cell outage detection and compensation function is configured to compensate for cell outages using one or more of fault reporting to OA&M elements, fault reporting from affected eNodeBs, fault reporting from eNodeBs that neighbor an affected eNodeB, reconfiguration of antenna parameters (e.g., adjustment of azimuth and tilt), reconfiguration of neighbor power, coordination between affected eNodeBs, or the like, as well as various combinations thereof.

In one embodiment, the cell outage detection and compensation function is configured to compensate for lost resource blocks (e.g., via adaptation of one or more eNodeBs) when a resource blocks outage event is detected. In one embodiment, the cell outage detection and compensation function is configured to perform one or more healing techniques to try to overcome the lost resource blocks condition (self-diagnostic, automated power cycling of equipment, or the like). In one embodiment, reporting of such errors (e.g., in terms of both degree and impact on user quality of experience) may be transmitted to the network management system for further processing.

In one embodiment, the cell outage detection and compensation function is configured to provide a technique for reducing service interruptions associated with a resource blocks outage. Specifically, in a high traffic density area where a large number of users require service, any resource blocks outage within that service area will result in a relatively high number of dissatisfied users. One technique for minimizing this problem is to identify high traffic density areas, identify the eNodeB normally associated with the high traffic density area, adapt the transmission power profiles and/or spectral allocations of this eNodeB to remove or reduce its coverage of the high traffic density area, and adapt the transmission power profiles and/or spectral allocation of neighboring eNodeBs to provide overlapping service coverage of the high traffic density area. In this manner, an outage associated with any one eNodeB will not result in a loss of service to all of the users within the high traffic density area. An exemplary embodiment of such a technique of cell outage detection and compensation is depicted and described with respect to FIG. 12.

It is noted that various embodiments of the automatic cell outage detection and compensation function may reduce (and, in at least some cases, minimize) system capacity loss following a cell outage.

FIG. 12 depicts an exemplary embodiment of cell outage detection and compensation. As depicted in FIG. 12, a portion of a cellular wireless network includes seven cells $1210_1$-$1210_7$ (collectively, cells 1210), arranged in a honeycomb pattern. The center cell $1210_4$ experiences an outage condition which causes a loss of cellular coverage in a portion of its coverage area (the portion denoted by β, which is adjacent to cells $1210_1$, $1210_2$, and $1210_3$). This cell outage condition is detected, and the load in the portion of the coverage area experiencing the outage condition is then shared among cells $1210_1$, $1210_2$, and $1210_3$ which have associated coverage areas adjacent to the portion of the coverage area experiencing the outage condition (illustratively, the α portion of cell $1210_1$, the γ and α portions of cell $1210_2$, and the γ portion of cell $1210_3$). This may be achieved by adjusting the antenna configurations of the relevant antennas of adjacent cells $1210_1$, $1210_2$, and $1210_3$ and/or in any other suitable manner. This automatic detection of the cell outage, and the associated compensation for the cell outage via load sharing, minimizes the impact of the cell outage.

As described herein, SONs may support various functions, including one or more of self-configuration of nodes (e.g., wireless access nodes and/or the like), physical cell identifier (PCI) configuration, automatic neighbor relationship management (which also may include automatic neighbor recognition), handoff optimization, load-balancing optimization, interference coordination, capacity optimization, coverage optimization, energy savings optimization, or the like, as well as various combinations thereof. It is noted that various embodiments of a SON may support various other functions. These functions may be implemented and used in various ways and, thus, also may interact in various ways. An exemplary embodiment of interactions between SON functions (which also may be referred to herein as SON use cases) is depicted and described with respect to FIG. 13.

Figure 13:
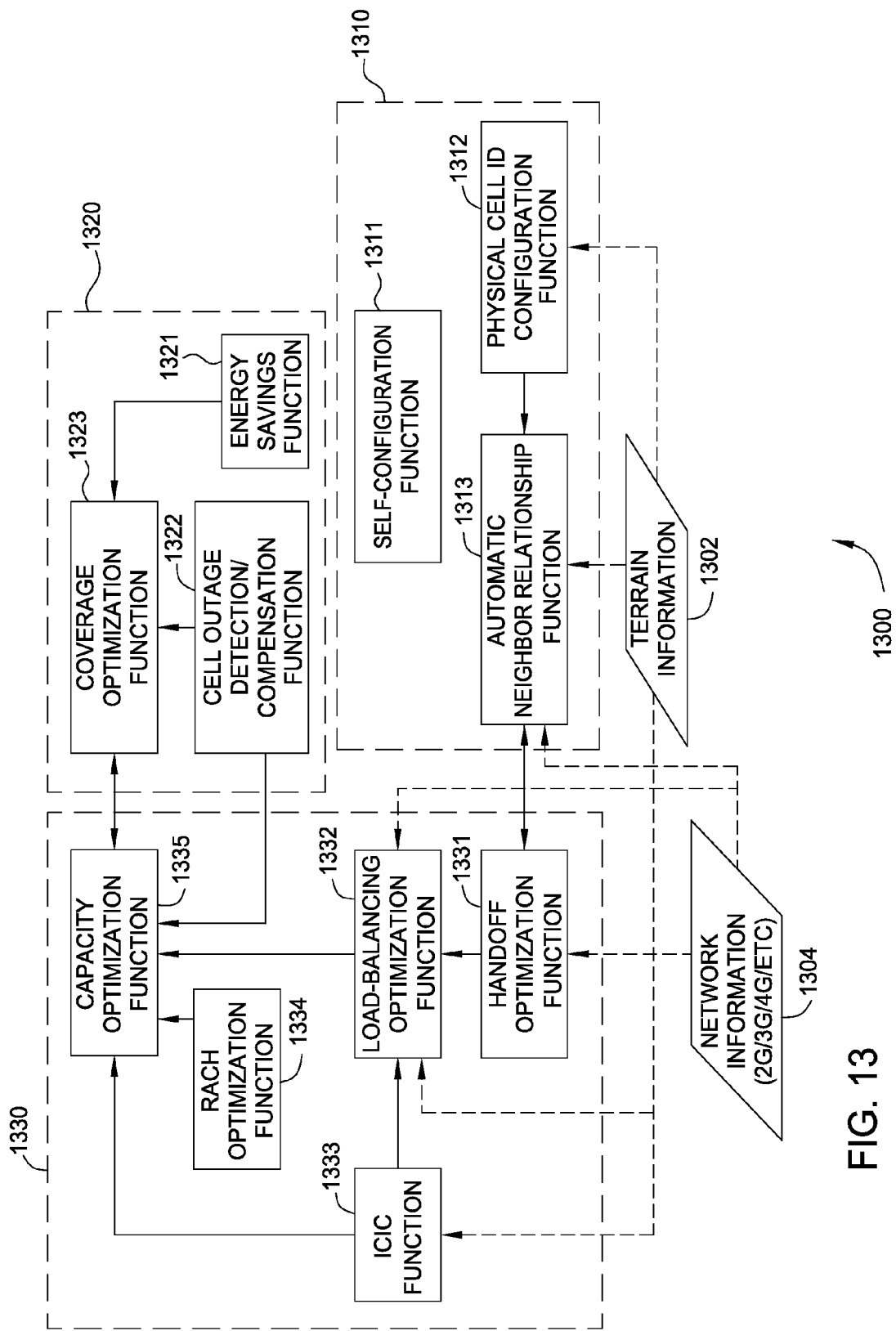
FIG. 13 depicts an exemplary embodiment of interactions between SON functions.

FIG. 13 depicts an exemplary embodiment of interactions between SON functions.

As depicted in FIG. 13, the SON functions include a first set of SON functions 1310 having an impact on operational expenditures, a second set of SON functions 1320 having an impact on coverage, and a third set of SON functions 1330 having an impact on capacity. The first set of SON functions 1310 includes a self-configuration function 1311, a PCI configuration function 1312, and an automatic neighbor relationship function 1313. The second set of SON functions 1320 includes an energy savings function 1321, a cell outage detection/compensation function 1322, and a coverage optimization function 1323. The third set of SON functions 1330 includes a handoff optimization function 1331, a load-balancing optimization function 1332, an ICIC function 1333, a Random Access Channel (RACH) optimization function 1334, and a capacity optimization function 1335. It is noted that at least some of the SON functions receive as input terrain information 1302 and/or cellular network information 1304. The terrain information 1302 may include information describing the terrain in which the cellular network(s) is deployed. The cellular network information 1304 may include one or more of configuration information, performance information, or the like, as well as various combinations thereof, of any associated cellular networks (e.g., for one or more of a 2G network(s), a 3G network(s), a 4G network(s), or the like as well as various combinations thereof).

As depicted in FIG. 13, the first set of SON functions 1310 supports various interactions of SON functions.

The self-configuration function 1311 may be configured to automatically configure a wireless access node for operation within a SON. In one embodiment, self-configuration function 1311 may be configured as depicted and described with respect to FIG. 7.

The self-configuration function 1311 is depicted as being a standalone function; however, it will be appreciated that this function may provide an input into and/or interact with various other SON functions (e.g., as depicted and described in FIG. 7).

The PCI configuration function 1312 receives terrain information 1302 as input. The PCI configuration function 1312 is configured to assign a PCI to a wireless access node. The PCI configuration function 1312 is configured to assign the PCI for the wireless access node based on terrain information associated with the SON. The PCI configuration function 1312 produces output information and provides the output information to automatic neighbor relationship function 1313. The PCI configuration function 1312

The automatic neighbor relationship function 1313 receives terrain information 1302, network information 1304, output information from PCI configuration function 1312, and output information from handoff optimization function 1331 as input. The automatic neighbor relationship function 1313 is configured to determine at least one neighbor wireless access node for inclusion in a neighbor list of a wireless access node. The automatic neighbor relationship function 1313 is configured to determine the at least one neighbor wireless access node based on at least one of network information associated with the SON or terrain information associated with the SON. The automatic neighbor relationship function 1313 is configured to determine the at least one neighbor wireless access node based on handoff information associated with the handoff optimization function 1331. The automatic neighbor relationship function 1313, when updating a neighbor list of a first wireless access node, is configured to receive a Radio Resource Control (RRC) measurement report from a wireless device where the RRC measurement report includes a PCI of a second wireless access node, propagate toward the wireless device an instruction for the wireless device to report a global PCI for the PCI of the second wireless access node, receive from the wireless device a report including the global PCI of the second wireless access node, and update the neighbor list of the first wireless access node to include the second wireless access node. The automatic neighbor relationship function 1313 produces output information and provides the output information to handoff optimization function 1331. It is noted that at least some embodiments of the automatic neighbor relationship function 1313 may be better understood by way of reference to FIG. 9. It is noted that the automatic neighbor relationship function 1313 also may be referred to herein as a neighbor relationship management function.

The energy savings function 1321 is configured to switch a power mode of an element of a wireless access node. The energy savings function 1321 produces output and provides the output to coverage optimization function 1323.

The cell outage detection/compensation function 1322 is configured to monitor for and compensate for a cell outage condition associated with a wireless access node. The cell outage detection/compensation function 1322 produces output and provides the output to coverage optimization function 1323 and capacity optimization function 1335. It is noted that at least some embodiments of the cell outage detection/compensation function 1322 may be better understood by way of reference to FIG. 12. It is noted that the cell outage detection/compensation function 1322 also may be referred to herein as a cell outage function.

The coverage optimization function 1323 is configured to improve cellular coverage within the SON. The coverage optimization function 1323 is configured to improve cellular coverage within the SON based on information associated with the energy savings function 1321 and information associated with the cell outage detection/compensation function 1322. The coverage optimization function 1323 receives output information from energy savings function 1321 and output information from cell outage detection/compensation function 1322 is input. The coverage optimization function 1323 produces output information and provides the output information to capacity optimization function 1335. It is noted that the coverage optimization function 1323 also may be referred to herein as a cellular coverage function.

The handoff optimization function 1331 is configured to improve handoffs of wireless devices between the wireless access node and one or more other wireless access nodes based on the terrain information 1302 associated with the SON and network information 1304 associated with the SON. The handoff optimization function 1331 receives network information 1304 and output information from automatic neighbor relationship function 1313 as input. The handoff optimization function 1331 produces output information and provides the output information to automatic neighbor relationship function 1313 and load-balancing optimization function 1332. It is noted that the handoff optimization function 1331 also may be referred to herein as a handoff function.

The load-balancing optimization function 1332 is configured to balance a load on a wireless access node based on information from the handoff optimization function 1331. The load-balancing optimization function 1332 receives terrain information 1302, network information 1304, and output information from handoff optimization function 1331 as input. The load-balancing optimization function 1332 produces output information and provides the output information to capacity optimization function 1335. It is noted that at least some embodiments of the load-balancing optimization function 1332 may be better understood by way of reference to FIG. 10. It is noted that the load-balancing optimization function 1332 also may be referred to herein as a load-balancing function.

The ICIC function 1333 is configured to reduce interference between a wireless access node and wireless access nodes adjacent to the wireless access node. The ICIC function 1333 receives terrain information 1302 as input. The ICIC function 1333 produces output information and provides output information to load-balancing optimization function 1332 and capacity optimization function 1335. It is noted that at least some embodiments of the ICIC function 1333 may be better understood by way of reference to FIG. 11.

The RACH optimization function 1334 is configured to improve a RACH associated with the wireless access node. The RACH optimization function 1334 produces output information and provides the output information to capacity optimization function 1335.

The capacity optimization function 1335 is configured to manage capacity usage at a wireless access node. The capacity optimization function 1335 receives output information from cell outage detection/compensation function 1322, output information from coverage optimization function 1323, output information from load-balancing optimization function 1332, output information from ICIC function 1333, and output information from our ACH optimization function 1334 as input. The capacity optimization function 1335 produces output information and provides the output information to coverage optimization function 1323. It is noted that the capacity optimization function 1335 also may be referred to herein as a capacity function.

It is noted that, although primarily depicted and described with respect to specific arrangements of and interactions between the SON functions, various other arrangements of and/or interactions between the SON functions may be supported.

It is noted that the various SON functions depicted and described with respect to FIG. 13 may be implemented using one or more processes. In one embodiment, for example, the first set of SON functions 1310 may be implemented as a process configured to provide the self-configuration function 1311, the PCI configuration function 1312, and the automatic neighbor relationship function 1313. In one embodiment, for example, the second set of SON functions 1320 may be implemented as a process configured to provide the energy savings function 1321, the cell outage detection/compensation function 1322, and the coverage optimization function 1323. In one embodiment, for example, the third set of SON functions 1330 may be implemented as a process configured to provide the handoff optimization function 1331, the load-balancing optimization function 1332, the ICIC function 1333, the Random Access Channel (RACH) optimization function 1334, and the capacity optimization function 1335. It is further noted that other combinations of SON functions, using one or more processes, are contemplated.

It is noted that, although primarily depicted and described with respect to embodiments in which the SON functions are implemented by a wireless access node, one or more of the SON functions may be implemented by one or more other types of network elements in a communication network. It is noted that the various SON functions may be implemented as part of a single network element or distributed across multiple network elements.

In one embodiment, the SON functions, and interactions between the SON functions, may be modeled and quantified in a manner for adapting the operation of the SON.

Figure 14:
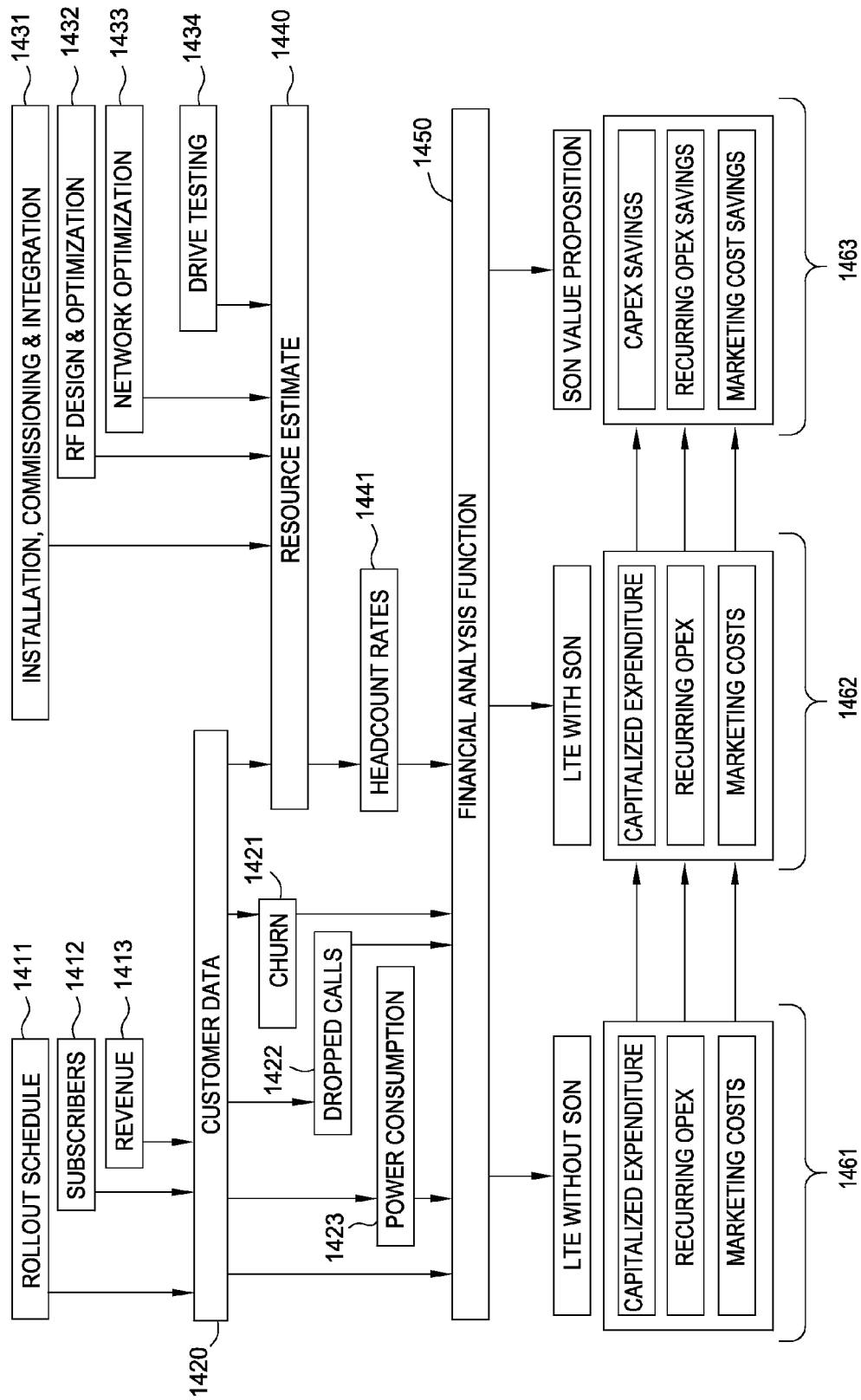
FIG. 14 depicts an embodiment of a mechanism to compute key cost elements related to evaluation of networks employing SON functions.

FIG. 14 depicts an embodiment of a mechanism to compute key cost elements related to evaluation of networks employing SON functions.

As depicted in FIG. 14, rollout schedule data 1411, subscriber data 1412, and revenue data 1413 may be processed to form customer data 1420. The customer data 1420 may be processed to produce churn data 1421, dropped calls data 1422, and power consumption data 1423. The customer data 1420 also may be processed (in combination with other types of data as discussed below).

As depicted in FIG. 14, installation, commissioning, and integration data 1431, RF design and optimization data 1432, network optimization data 1433, drive testing data 1434, and customer data 1420 may be processed to form resource estimate data 1440. The resource estimate data 1440 may be processed to produce headcount rates data 1441.

As depicted in FIG. 14, customer data 1420, churn data 1421, dropped calls data 1422, power consumption data 1423, and headcount rates data 1441 is input into a financial analysis function 1450. The financial analysis function 1450 is configured to process the input information to determine costs associated with an LTE network that does not include SON functions 1461 (e.g., capital expenditures, recurring operational expenditures, marketing costs, and the like) and costs associated with an LTE network that does include SON functions 1462 (e.g., capital expenditures, recurring operational expenditures, marketing costs, and the like). The financial analysis function 1450 also may be configured to analyze the costs associated with an LTE network that does not include SON functions 1461 and the costs associated with an LTE network that does include SON functions 1462 in order to determine a SON value proposition 1463, where the SON value proposition 1463 may be represented using one or more of capital expenditure savings resulting from use of SON functions in the LTE network, recurring operational expenditure savings resulting from use of SON functions in the LTE network, marketing cost savings resulting from use of SON functions in the LTE network, or the like, as well as various combinations thereof.

Figure 15:
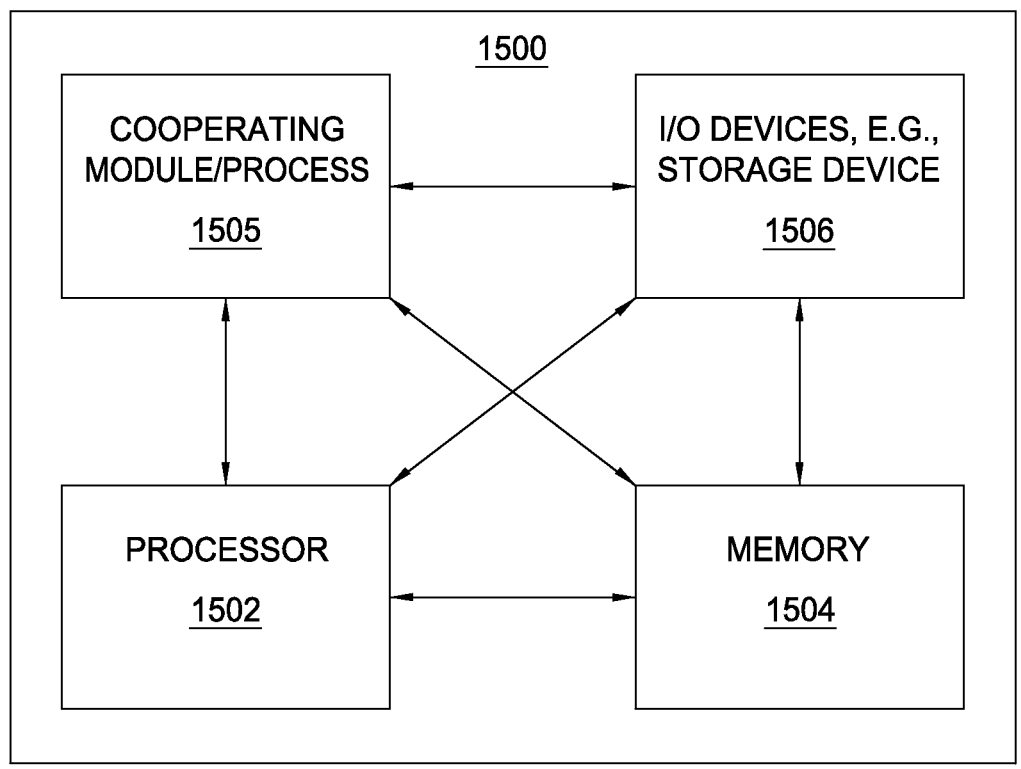
FIG. 15 depicts a high-level block diagram of a computer suitable for use in performing functions described herein.

FIG. 15 depicts a high-level block diagram of a computer suitable for use in performing functions described herein.

The computer 1500 includes a processor 1502 (e.g., a central processing unit (CPU) and/or other suitable processor(s)) and a memory 1504 (e.g., random access memory (RAM), read only memory (ROM), and the like).

The computer 1500 also may include a cooperating module/process 1505. The cooperating process 1505 can be loaded into memory 1504 and executed by the processor 1502 to implement functions as discussed herein and, thus, cooperating process 1505 (including associated data structures) can be stored on a computer readable storage medium, e.g., RAM memory, magnetic or optical drive or diskette, and the like.

The computer 1500 also may include one or more input/output devices 1506 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 1500 depicted in FIG. 15 provides a general architecture and functionality suitable for implementing functional elements described herein and/or portions of functional elements described herein. For example, the computer 1500 provides a general architecture and functionality suitable for implementing one or more of the elements or sub-elements depicted and described herein.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus configured to support a self-optimizing network (SON) comprising a wireless access node, the apparatus comprising:
    a processor and a memory communicatively connected to the processor, the processor configured to:
        perform a self-configuration function to automatically configure the wireless access node for operation within the SON;
        perform a physical cell identifier (PCI) configuration function configured to assign a PCI to the wireless access node;
        perform a handoff function configured to improve handoffs of wireless devices between the wireless access node and one or more other wireless access nodes; and
        perform a neighbor relationship management function configured to determine at least one neighbor wireless access node for inclusion in a neighbor list of the wireless access node based on handoff information associated with the handoff function.

2. The apparatus of claim 1, wherein the self-configuration function is configured to perform one or more setup actions comprising at least one of:
    configuring an Internet Protocol (IP) address for the wireless access node;
    detecting an Operations, Administration, and Maintenance (OAM) server;
    authenticating the wireless access node;
    associating the wireless access node with a gateway; or
    downloading at least one of software for the wireless access node or one or more operational parameters for the wireless access node.

3. The apparatus of claim 1, wherein the self-configuration function is configured to perform an initial radio configuration comprising at least one of performing an initial neighbor list configuration or configuring one or more operational parameters for the wireless access node.

4. The apparatus of claim 1, wherein the PCI configuration function is configured to assign the PCI for the wireless access node based on terrain information associated with the SON.

5. The apparatus of claim 1, wherein the neighbor relationship management function is configured to determine the at least one neighbor wireless access node based on at least one of network information associated with the SON or terrain information associated with the SON.

6. The apparatus of claim 1, wherein the processor is configured to:
    initiate a drive test at the wireless access node;
    analyze a result of the drive test; and
    reconfigure the wireless access node based on analysis of the result of the drive test.

7. An apparatus configured to support a self-optimizing network (SON) comprising a wireless access node, the apparatus comprising:
    a processor and a memory communicatively connected to the processor, the processor configured to:

perform a handoff function configured to improve handoffs of wireless devices between the wireless access node and one or more other wireless access nodes based on terrain information associated with the SON and network information associated with the SON;

perform a load-balancing function configured to balance a load on the wireless access node based on information from the handoff function; and perform a capacity function configured to manage capacity usage at the wireless access node, wherein the handoff function configured to improve handoffs of wireless devices between the wireless access node and one or more other wireless access nodes based on information associated with the neighbor relationship function.

8. An apparatus configured to support a self-optimizing network (SON) comprising a wireless access node, the apparatus comprising:

a processor and a memory communicatively connected to the processor, the processor configured to:

perform a self-configuration function to automatically configure the wireless access node for operation within the SON;

perform a physical cell identifier (PCI) configuration function configured to assign a PCI to the wireless access node;

perform a neighbor relationship management function configured to determine at least one neighbor wireless access node for inclusion in a neighbor list of the wireless access node based on handoff information associated with the handoff function, wherein the wireless access node is a first wireless access node, wherein the neighbor relationship management function is configured to:

receive a Radio Resource Control (RRC) measurement report from a wireless device, the RRC measurement report comprising a PCI of a second wireless access node;

propagate, toward the wireless device, an instruction for the wireless device to report a global PCI for the PCI of the second wireless access node;

receive, from the wireless device, a report including the global PCI of the second wireless access node; and update the neighbor list of the first wireless access node to include the second wireless access node.

9. The apparatus of claim 8, wherein the self-configuration function is configured to perform one or more setup actions comprising at least one of:

configuring an Internet Protocol (IP) address for the wireless access node;

detecting an Operations, Administration, and Maintenance (OAM) server;

authenticating the wireless access node;

associating the wireless access node with a gateway; or downloading at least one of software for the wireless access node or one or more operational parameters for the wireless access node.

10. The apparatus of claim 8, wherein the self-configuration function is configured to perform an initial radio configuration comprising at least one of performing an initial neighbor list configuration or configuring one or more operational parameters for the wireless access node.

11. The apparatus of claim 8, wherein the PCI configuration function is configured to assign the PCI for the wireless access node based on terrain information associated with the SON.

12. The apparatus of claim 8, wherein the neighbor relationship management function is configured to determine the at least one neighbor wireless access node based on at least one of network information associated with the SON or terrain information associated with the SON.

13. The apparatus of claim 8, wherein the processor is configured to:

initiate a drive test at the wireless access node;

analyze a result of the drive test; and reconfigure the wireless access node based on analysis of the result of the drive test.

14. An apparatus configured to support a self-optimizing network (SON) comprising a wireless access node, the apparatus comprising:

a processor and a memory communicatively connected to the processor, the processor configured to:

perform a handoff function configured to improve handoffs of wireless devices between the wireless access node and one or more other wireless access nodes based on terrain information associated with the SON and network information associated with the SON;

perform a load-balancing function configured to balance a load on the wireless access node based on information from the handoff function;

perform a capacity function configured to manage capacity usage at the wireless access node; and perform an Inter-Cell Interference Coordination (ICIC) function configured to reduce interference between the wireless access node and wireless access nodes adjacent to the wireless access node.

15. The apparatus of claim 14, wherein the load-balancing function is configured to balance a load on the wireless access node based on information associated with the ICIC function.

16. An apparatus configured to support a self-optimizing network (SON) comprising a wireless access node, the apparatus comprising:

a processor and a memory communicatively connected to the processor, the processor configured to:

perform a handoff function configured to improve handoffs of wireless devices between the wireless access node and one or more other wireless access nodes based on terrain information associated with the SON and network information associated with the SON;

perform a load-balancing function configured to balance a load on the wireless access node based on information from the handoff function;

perform a capacity function configured to manage capacity usage at the wireless access node; and perform a neighbor relationship function configured to determine at least one neighbor wireless access node for the wireless access node.

17. An apparatus configured to support a self-optimizing network (SON) comprising a wireless access node, the apparatus comprising:

a processor and a memory communicatively connected to the processor, the processor configured to:

perform an energy savings function configured to switch a power mode of an element of the wireless access node;

perform a cell outage function configured to monitor for a cell outage condition associated with the wireless access node; and perform a cellular coverage function configured to improve cellular coverage within the SON based on information associated with the energy savings function and information associated with the cell outage function, wherein the cell outage function is further configured to:
    detect a cell outage condition associated with the wireless access node; and
    when the cell outage condition is detected, initiate a cell outage correction action configured to correct the cell outage condition associated with the wireless access node.

18. The apparatus of claim 17, wherein the element of the wireless access node comprise at least one of a component of the wireless access node, a board of the wireless access node, or a sector of the wireless access node.

19. The apparatus of claim 17, wherein the energy savings function is configured to switch the power mode of the element of the wireless access node between:
    an active mode; and
    an idle mode or an off mode.

20. An apparatus configured to support a self-optimizing network (SON) comprising a wireless access node, the apparatus comprising:
    a processor and a memory communicatively connected to the processor, the processor configured to:
        perform an energy savings function configured to switch a power mode of an element of the wireless access node;
        perform a cell outage function configured to monitor for a cell outage condition associated with the wireless access node;
        perform a cellular coverage function configured to improve cellular coverage within the SON based on information associated with the energy savings function and information associated with the cell outage function;
        perform a capacity function configured to manage capacity usage at the wireless access node; and
        perform a capacity function configured to manage capacity usage at the wireless access node,
    wherein the cellular coverage function is configured to improve cellular coverage within the SON based on capacity information associated with the capacity function.

21. The apparatus of claim 20, wherein the element of the wireless access node comprise at least one of a component of the wireless access node, a board of the wireless access node, or a sector of the wireless access node.

22. The apparatus of claim 20, wherein the energy savings function is configured to switch the power mode of the element of the wireless access node between:
    an active mode; and
    an idle mode or an off mode.

23. An apparatus configured to support a self-optimizing network (SON) comprising a wireless access node, the apparatus comprising:
    a processor and a memory communicatively connected to the processor, the processor configured to:
        perform a handoff function configured to improve handoffs of wireless devices between the wireless access node and one or more other wireless access nodes based on terrain information associated with the SON and network information associated with the SON;
        perform a load-balancing function configured to balance a load on the wireless access node based on information from the handoff function;
        perform a capacity function configured to manage capacity usage at the wireless access node;
        perform an Inter-Cell Interference Coordination (ICIC) function configured to reduce interference between the wireless access node and wireless access nodes adjacent to the wireless access node;
        perform a Random Access Channel (RACH) function configured to improve a RACH associated with the wireless access node; and
        perform a cellular coverage function configured to improve cellular coverage within the SON.

24. The apparatus of claim 23, wherein the capacity function is configured to manage capacity usage at the wireless access node based on information associated with the ICIC function, information associated with the RACH function, and information associated with the cellular coverage function.

* * * * *